(12) United States Patent
Moon

(10) Patent No.: US 10,470,220 B2
(45) Date of Patent: Nov. 5, 2019

(54) APPARATUS AND METHOD FOR RANDOM ACCESS IN WIRELESS COMMUNICATION SYSTEM

(71) Applicants: Samsung Electronics Co., Ltd., Gyeonggi-do (KR); IUCF-HYU (Industry-University Cooperation Foundation Hanyang University), Seoul (KR)

(72) Inventor: Hi-Chan Moon, Seoul (KR)

(73) Assignees: Samsung Electronics Co., Ltd., Suwon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 118 days.

(21) Appl. No.: 15/640,331

(22) Filed: Jun. 30, 2017

(65) Prior Publication Data

US 2018/0014333 A1 Jan. 11, 2018

(30) Foreign Application Priority Data

Jul. 8, 2016 (KR) ........................ 10-2016-0087067

(51) Int. Cl.
| | |
|---|---|
| *H04W 74/08* | (2009.01) |
| *H04L 5/14* | (2006.01) |
| *H04L 5/00* | (2006.01) |
| *H04B 17/336* | (2015.01) |
| *H04W 48/20* | (2009.01) |

(52) U.S. Cl.
CPC ......... *H04W 74/0833* (2013.01); *H04L 5/005* (2013.01); *H04L 5/0051* (2013.01); *H04L 5/14* (2013.01); *H04B 17/336* (2015.01); *H04W 48/20* (2013.01)

(58) Field of Classification Search
CPC .... H04W 74/08; H04W 74/0833; H04L 5/14; H04L 5/0051
See application file for complete search history.

(56) References Cited

U.S. PATENT DOCUMENTS

| | | | |
|---|---|---|---|
| 2010/0098051 A1* | 4/2010 | Uemura | H04W 56/0015 370/350 |
| 2012/0063509 A1 | 3/2012 | Coulter | |
| 2012/0250659 A1* | 10/2012 | Sambhwani | H04W 36/30 370/332 |
| 2014/0302855 A1* | 10/2014 | Nory | H04W 48/10 455/437 |

* cited by examiner

*Primary Examiner* — Wei Zhao

(57) ABSTRACT

The present disclosure relates to a pre-5$^{th}$-generation (5G) or 5G communication system to be provided for supporting higher data rates beyond 4th-generation (4G) communication system such as long term evolution (LTE). A method of operating a remote node in a wireless communication system includes: determining each of instantaneous channel states between host nodes and the remote node based on reference signals received from the host nodes during some of time intervals for a channel estimation; determining a host node for random access among the host nodes based on the determined instantaneous channel states; and when a value indicating a state of a channel between the determined host node and the remote node is larger than a threshold value, transmitting a signal for the random access to the host node.

20 Claims, 17 Drawing Sheets

APPARATUS AND METHOD FOR RANDOM ACCESS IN WIRELESS COMMUNICATION SYSTEM

CROSS-REFERENCE TO RELATED APPLICATION(S) AND CLAIM OF PRIORITY

The present application is related to and claims priority under 35 U.S.C. § 119(a) to Korean Application Serial No. 10-2016-0087067, which was filed in the Korean Intellectual Property Office on Jul. 8, 2016, the entire content of which is hereby incorporated by reference.

TECHNICAL FIELD

The present disclosure relates to a wireless communication system and, more particularly, to an apparatus and a method for transmitting a signal for random access.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) system."

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to provide wireless communication service to a user, a remote node generally performs random access to access a higher node (e.g., a host node). When the remote node attempts such random access, a signal for random access may not be transmitted to the host node due to a channel state or interference with another signal, or the host node may reject the attempt at random access. When the random access fails for this reason, the remote node repeatedly attempts the random access until the random access is successful. Such repetitive random access may cause excessive power consumption by the remote node that performs the random access and may cause interference with another remote node.

Accordingly, an apparatus and a method for performing random access having a high success probability are required.

SUMMARY

To address the above-discussed deficiencies, it is a primary object to provide an apparatus and method for improving the performance of random access.

In accordance with an aspect of the present disclosure, method of operating a remote node in a wireless communication system is provided. The method includes: determining each of instantaneous channel states between host nodes and the remote node based on reference signals received from the host nodes during some of time intervals for a channel estimation; determining a host node for random access among the host nodes based on the determined instantaneous channel states; and when a value indicating a state of a channel between the determined host node and the remote node is larger than a threshold value, transmitting a signal for the random access to the host node.

In accordance with another aspect of the present disclosure, an apparatus of a remote node in a wireless communication system is provided. The apparatus includes: a controller; and a transceiver functionally connected to the controller, wherein the controller determines each of instantaneous channel states between host nodes and the remote node based on reference signals received from the host nodes during some of time intervals for a channel estimation and determines a host node for random access among the host nodes based on the determined instantaneous channel states, and the transceiver is configured to, when a value indicating a state of a channel between the determined host node and the remote node is larger than a threshold value, transmit a signal for the random access to the host node.

In accordance with another aspect of the present disclosure, a method of a host node in a wireless communication system is provided. The method includes: transmitting a reference signal for channel estimation to a remote node; and receiving a signal for random access from the remote node, wherein the host node receiving the signal for the random access corresponds to a host node determined among a plurality of host nodes based on an instantaneous channel state according to the reference signal, and the signal for the random access is transmitted when a state of a channel between the host node and the remote node meets a transmission condition.

In accordance with another aspect of the present disclosure, an apparatus of a host node in a wireless communication system is provided. The apparatus includes: a controller; and a transceiver functionally connected to the controller, wherein the controller is configured to transmit a reference signal for a channel estimation and to receive a signal for random access from the remote node, the host node receiving the random access corresponds to a host node determined among a plurality of host nodes based on an instantaneous channel state according to the reference signal, and the signal for the random access is transmitted when a state of a channel between the host node and the remote node meets a transmission condition.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
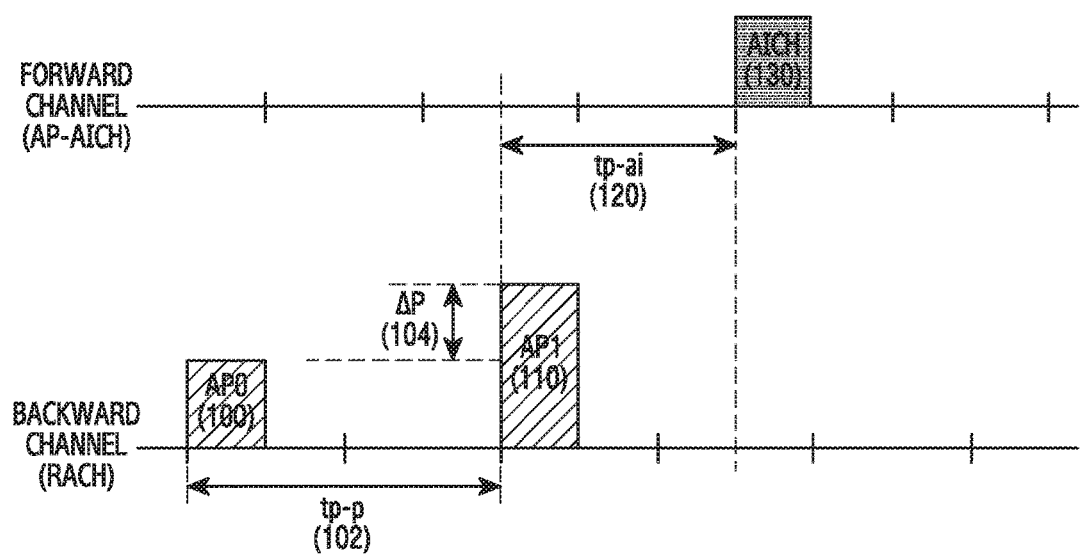
FIG. 1 illustrates an example of a random-access procedure according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A hardware access method is exemplified in the various embodiments which will be described below. However, the various embodiments include a technology using both hardware and software, and therefore a software-based access method is not excluded from the various embodiments.

Hereinafter, the present disclosure describes an apparatus and a method for performing random access in a wireless communication system.

The term (e.g., reference signal or signal for random access) referring to a signal used in the following description, the term referring to a network entity (e.g., a remote node or a host node), and the term referring to an element of the device (e.g., a transceiver or a controller) are only examples for the convenience of description. Accordingly, the present disclosure is not limited to the following terms, and other terms having the same technical meaning may be used.

Further, in the present disclosure, the terms and names defined in wide code division multiple access (W-CDMA) and 3rd generation partnership project (3GPP) long term evolution (LTE) standards will be set forth for the convenience of description, but the present disclosure is not limited thereto, and may be equally applied to a system complying with another standard.

Random access corresponds to a procedure in which a remote node accesses a host node to perform wireless communication in a wireless communication system, wherein, when the remote node needs initial access or handover, the remote node may determine a host node to perform random access and perform the random access with the determined host node. For example, a mobile communication system such as W-CDMA of 3GPP, LTE, or cdma2000 of or 3GPP2 has defined a random-access channel, and the random access is performed through the random-access channel.

Meanwhile, the Internet has evolved to the internet of things (IoT) network, in which information is exchanged and processed between distributed components such as objects and the like in a human-oriented connection network in which humans generate and consume information. An internet of everything (IoE) technology, in which a big-data processing technology through a connection with a cloud server or the like is combined with the IoT technology, has emerged. In order to implement the IoT, technical factors such as a sensing technique, wired/wireless communication, network infrastructure, service interface technology, and security technology are required, and thus technologies such as a sensor network, machine to machine (M2M) communication, machine type communication (MTC), and the like for a connection between objects have recently been researched. In an IoT environment, through the collection and analysis of data generated in objects connected through communication, an intelligent internet technology (IT) service to create new value for human lives may be provided. The IoT may be applied to fields such as a smart home, smart building, smart city, smart car, connected car, smart grid, health care, smart home appliance, or high-tech medical service, through the convergence of the conventional IT and various industries.

Meanwhile, various attempts for applying a technology for high-speed communication to an IoT network have been made. For example, attempts for using techniques such as beamforming, multiple input multiple output (MIMO), and an antenna array for the IoT network have been made.

In the IoT environment, the remote node generally transmits small-capacity data for long periods. For example, a meter transmitting an amount of power used by a user to a higher node (server) through a wireless channel may transmit data of several bits including information indicating the amount of power used by the user and ID (identifier) information of the meter to the higher node. The meter may be more useful in an island and mountainous area having a relatively small number of users who use a communication service. Further, since the area having the small number of users who use the communication service has a relatively small number of infrastructure facilities (e.g., host nodes), the distances between the infrastructure facilities and the meter may be relatively long.

Meanwhile, in spite of the small size of data, an MTC device such as the meter may necessarily perform random access to transmit the data to a host node (e.g., base station). When a distance between the meter and the host node is relatively long, the meter may transmit a signal for random access with higher power in order to transmit a small amount of data to the remote host node. Further, when the distance between the meter and the host node is relatively long, the meter may be able to repeatedly transmit the signal for the random access in order to succeed in establishing random access. The signal for the random access repeatedly transmitted at a higher power may cause interference with another remote node that desire to perform random access and another host node.

Further, when the distance between the host node and the meter is relatively long, a signal transmitted from the meter or the host node may be relatively greatly influenced by a channel state between the host node and the meter. When the transmitted signal is a signal for the random access, it may be required to adaptively transmit the signal for the random access depending on the channel state between the host node and the meter in order to transmit the signal for the random access.

FIG. 1 illustrates an example of a random-access procedure according to embodiments of the present disclosure. FIG. 1 may illustrate an example of a random-access procedure between a remote node and a host node in a WCDMA standard.

Referring to FIG. 1, a forward channel corresponds to a channel for a signal that the host node transmits to the remote node. The forward channel may be referred to as a downlink channel. For example, the forward channel may include an access preamble-acquisition indication channel (AP-AICH).

A reverse channel corresponds to a channel for a signal which the remote node transmits to the host node. The reverse channel may be referred to as an uplink channel. For example, the reverse channel may include a random-access channel (RACH).

The remote node transmits a preamble to the RACH to acquire initial synchronization. For example, the remote node may transmit access probe 0 (AP0) 100 including the preamble to the host node through the RACH.

When the remote node has not received a response signal of AP#0 100 from the host node for a time of tp-p 102, the remote node may transmit AP#1 110 including the preamble to the host node through the RACH based on a transmission power higher than the transmission power of AP#0 100 by P 104. In other words, when the response signal of AP#0 100 has not been received for tp-p 102, the remote node may determine that random access through transmission of AP#0 100 has failed. In order to succeed in the random access, which has been determined to be failed, the remote node may re-attempt the random access by transmitting AP#1 110 to the host node based on a transmission power higher than the transmission power of AP#0 100.

When the host node receives AP#1 110 from the remote node through the random-access channel, the host node waits for a time of tp-ai 120 and then transmits a signal having the same signature as AP#1 110 to the remote node through an AICH 130 corresponding to another downlink channel. Although not illustrated, the remote node may receive a signal including the same signature as AP#1 110 from the host node through the AICH 130. The remote node having received the signal including the same signature as AP#1 110 may demodulate the received signal so as to acquire the signature included in the received signal and an acquisition indicator. Although not illustrated, when it is identified that the host node acknowledges the random access through the acquired acquisition indicator, the remote node may wait for a time of tp-mag and then transmit data to the host node through the RACH. In some embodiments, the remote node may transmit an access probe through the RACH based on transmission power corresponding to AP#1 110. For example, when an ACK message is received through the AICH, the remote node may transmit a message for random access to the host node through the RACH. The time length of the message for random access is generally 10 milliseconds (ms).

LTE corresponds to the standard of another mobile communication system defined by 3GPP. In a frequency division duplex (FDD)-based LTE system, a random-access procedure similar to that in FIG. 1 may be performed. For example, in the LTE standard, the remote node (e.g., user equipment (UE)) may transmit a preamble for random access to the host node (e.g., evolved NodeB (eNB)) through a physical random access channel (PRACH). When the host node receives the preamble for the random access through the PRACH, the host node may transmit a signal for allocating resources for an uplink channel through a physical downlink control channel (PDCCH). In response to the reception of the signal for allocating the resources for the uplink channel, the remote node may transmit data to the host node through a physical uplink shared channel (PUSCH). In general, the length of the PUSCH is 1 ms.

Typically, in the random-access procedure, the remote node may determine a host node to perform random access through an open-loop power control scheme and determine the transmission power of a signal for the random access. The open-loop power control scheme corresponds to a scheme for determining transmission power based on the state of a channel between the host node and the remote node without a negotiation procedure with the host node having determined the transmission power. For example, the remote node performing the random access may measure the reception power of a signal received through a forward channel for a designated time and determine the host node having the best channel state as a target host node to which the signal for the random access is transmitted. Further, the remote node may transmit the signal for the random access to the determined target node based on the determined transmission power. The designated time may have various values depending on the remote node or settings of a system including the remote node. For example, the designated time may be scores of ms or longer. For example, the designated time may be about 80 ms.

In some embodiments, the remote node may use an Identifier (ID) of the remote node when transmitting the signal for the random access. In other embodiments, the remote node may set a transmission condition predefined with the host node and may transmit the signal for the random access in the predefined condition. Only when the predefined condition is met may the remote node transmit the signal for the random access to the host node, so that the remote node may not transmit an entirety or a part of the ID of the remote node to the host node, and in this case the host node may check the predefined condition and thus identify the remote node. The remote node may reduce the length of the message by omitting the entirety or the part of the ID of the remote node, and as a result, may reduce the amount of information transmitted to the host node at the time of performing the random access or later. Through such a process, the remote node may actually increase the capacity of an uplink channel for transmitting data to the host node.

Figure 2:
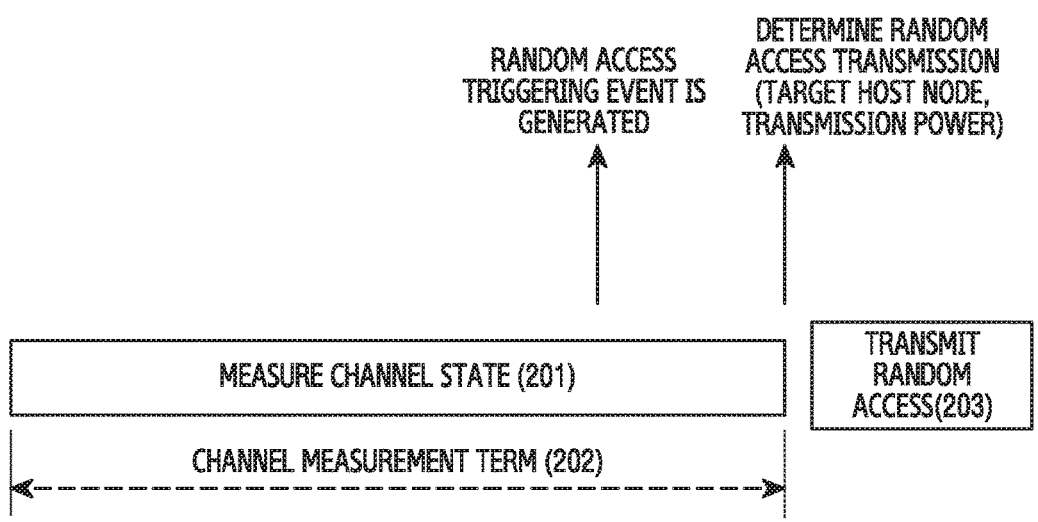
FIG. 2 illustrates an example of a procedure of determining a host node for random access according to embodiments of the present disclosure.

FIG. 2 illustrates an example of a procedure for determining a host node for random access according to embodiments of the present disclosure.

Referring to FIG. 2, the remote node measures states of channels between the remote node and host nodes during a channel measurement interval 202, as indicated by a reference numeral 201. The channel measurement interval 202 may be an interval for measuring the states of the channels between the remote node and the host nodes in order to determine the host node (that is, a target host node on which the remote node performs random access) to which the remote node transmits a signal for random access. In some embodiments, the remote node may measure the states of the channels between the remote node and the host nodes based on a reference signal received during the channel measurement interval 202. The remote node may determine information indicating the states of the channels between the remote node and the host nodes based on the received reference signal.

The reference signal may be a predetermined signal which both the host node and the remote node know. For example, the reference signal may include a cell-specific reference signal (CS-RS) transmitted in common to remote nodes located in a serving cell of the host node, a channel state indicator (CSI) reference signal (CSI-RS) of a channel for channel state feedback, or a demodulation reference signal (DMRS). The reference signal may be referred to as a pilot signal. The reference signal may be referred to as a pilot signal. The information indicating the states of the channels between the remote node and the host nodes may include at least one of a channel matrix, a channel gain, a channel quality (e.g., a signal to interference plus noise ratio. (SINR)), and a precoding matrix index (PMI).

In general, in order to determine the host node to which the signal for random access is transmitted, the remote node measures the state of the channel between the host node and the remote node for a relatively long time. Since the remote node transmits data to the host node or receives data from the host node for a relatively long time after the random access, the remote node measures the state of the channel for a relatively long time and selects a channel statistically having a good long-term channel state from channels between the host nodes and the remote node. For example, when the remote node accesses the host node to make a call with another remote node (or a peer), the remote node may determine to perform random access to a host node having a statistically better channel state through a long-term channel measurement since the call requires relatively long data transmission/reception.

However, in this case, it is difficult to expect the transmission of random access that reflects the state of a channel in an instantaneous fading or short-term fading environment. Further, in the FDD communication system, states of channels of the downlink, in which the remote node measures the channel, and the uplink, in which the remote node transmits random access, may be different due to frequency selectivity. Accordingly, the remote node using the general transmission scheme of the signal for random access may experience difficulty in efficiently selecting a random access host node reflecting a channel state and determining transmission power.

When the remote node detects the generation of a random-access triggering event (e.g., initial access or handover), the remote node determines to transmit a signal for random access. The signal for the random access corresponds to a signal which the remote node transmits to the host node for the random access. For example, the signal for the random access may include a random-access request message. In another example, the signal for the random access may include a random access preamble or may also include information for the random access and data that the remote node desires to transmit.

The remote node may determine the power required for transmitting the signal for random access to the host node in order to perform the random access. For example, the remote node may determine the host node with which to perform random access based on a channel state with each host node measured during a channel measurement term and determine the transmission power of a signal for the random access to be transmitted to the determined host node. Further, the remote node transmits the signal for the random access to the determined host node with the determined transmission power, as indicated by a reference numeral 203.

The remote node may receive a response message to the random-access request message. The response message may include information on whether the random access is successful or failed, synchronization information, or information for resource allocation. When the response signal received from the determined host node includes information indicating failure of the random access or when no response signal is received from the determined host node for a predetermined time, the remote node may determine that the random access has failed. In some embodiments, in response to the determination of failure of the random access, the remote node may measure the channel with the host node again in order to re-perform the random access.

When it is determined that the channel state has been improved based on the result of the re-performed measurement of the channel, the remote node may attempt random access to the host node again. In other embodiments, when it is determined that random access to the determined host node has failed, the remote node may measure the channel again based on reference signals received from a plurality of host nodes. The remote node may select a host node again to transmit the signal for the random access based on the re-performed measurement of the channel. In other embodiments, the remote node may determine whether to transmit the signal for the random access to the host node re-selected in response to the determination on the failure of the random access based on a channel state between the re-selected host node and the remote node.

Figure 3:
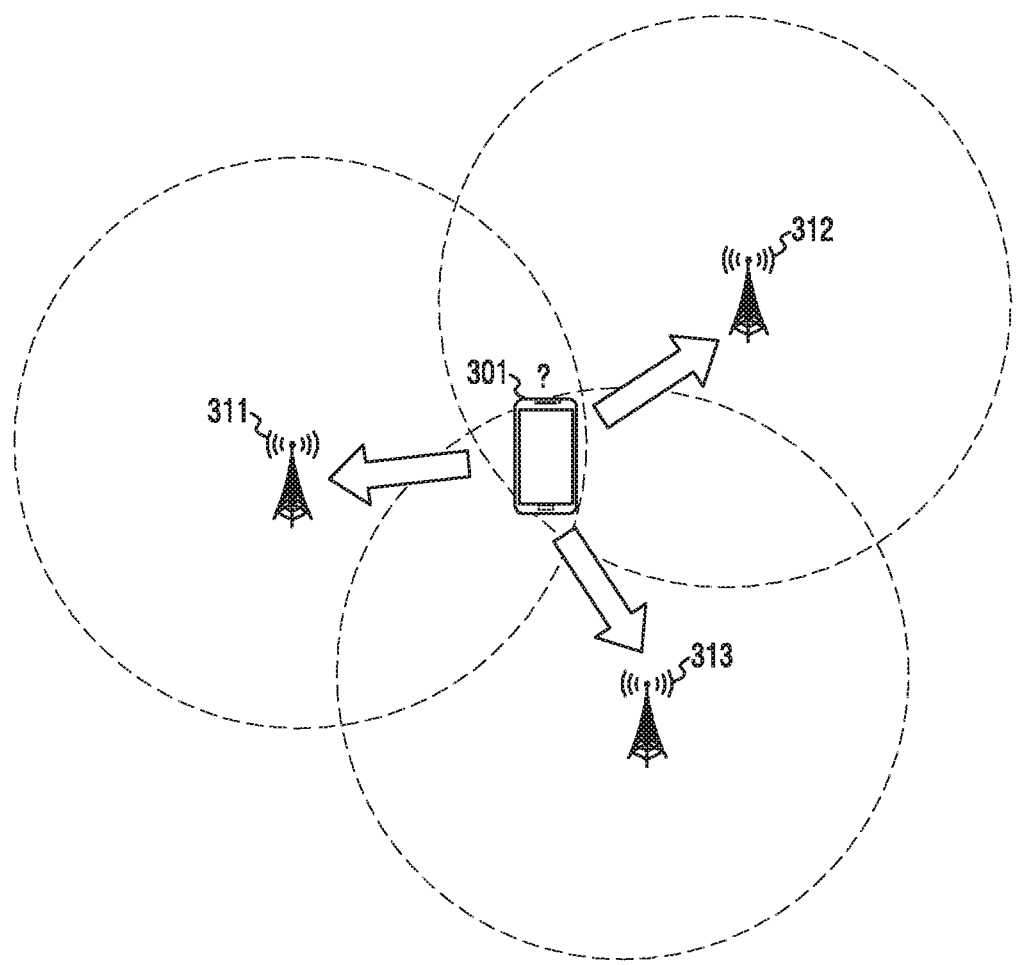
FIG. 3 illustrates an example of a procedure in which a remote node determines a host node to which a signal for random access is transmitted according to embodiments of the present disclosure.

FIG. 3 illustrates an example of a procedure in which the remote node determines the host node to which a signal for random access is transmitted according to embodiments of the present disclosure.

Referring to FIG. 3, a remote node 301 may be a device that communicates with another entity (peer). The remote node 301 may be a mobile device. In some embodiments, the remote node 301 may be a mobile phone, a smart phone, a music player, a portable game console, a navigation system, or a laptop computer. In other embodiments, the remote node 301 may be a device that transmits or receives data through a radio link to provide an IoT service. For example, the remote node 301 may be an MTC device such as a meter that transmits information on an amount of power used by the user to a server during a predetermined period or a device that performs M2M communication. The remote node 301 may be referred to as a terminal, a user equipment (UE), an electronic device, or a mobile station (MS) in a mobile communication system, and may be referred to as a station (STA) in a wireless local access network (WLAN) system.

Host nodes 311 to 313 may provide wireless communication service to the remote node 301. For example, the host nodes 311 to 313 may provide control information so that the remote node 301 within a coverage area can communicate with another peer. In another example, the host nodes 311 to 313 may transmit data to the remote node 301 within the coverage area or may receive data from the remote node 301. The host node may be referred to as a base station or an eNB in a mobile communication system, and may be referred to as an access point (AP) in a wireless LAN system.

As described above, when initial access or handover is required for wireless communication, the remote node performs random access. As illustrated in FIG. 3, the remote node located in a cell boundary area, that is, a handover area, may measure (or determine) the states of channels between the host nodes 311 to 313 and the remote node to transmit a signal for random access. The remote node 301 may determine the host node to which the signal for the random access is transmitted based on the measured states of the channels. In some embodiments, the remote node 301 may determine whether to transmit the signal for the random access to the determined host node. For example, when it is determined that the state of the channel between the determined host node and the remote node 301 is lower than a predetermined reference, the remote node 301 may not transmit the signal for the random access to the determined host node. In another example, when it is determined that the state of the channel between the determined host node and the remote node 301 is higher than or equal to the predetermined reference, the remote node 301 may transmit the signal for the random access to the determined host node.

Through the process of determining the host node to which the signal for the random access is transmitted and the process of determining whether to transmit the signal for the random access, the remote node may reduce the power consumed through the random-access procedure. For example, when the remote node attempts random access even though the state of the channel between the determined host node and the remote node is bad, the attempted random access may fail. The remote node may re-attempt the random access to acquire synchronization with the host node. When the state of the channel between the determined host node and the remote node is still bad, the re-attempted random access may also fail. Through the process of determining the host node to which the signal for the random access is transmitted and the process of determining whether to transmit the signal for the random access, the remote node does not attempt a random-access procedure that has been determined to have a high failure probability, thereby reducing the power consumed in the course of performing random access. Further, through the process of determining the host node to which the signal for random access is transmitted and the process of determining whether to transmit the signal for random access, the entire system may guarantee a higher random access success rate by preventing the transmission of signals unnecessary for random access.

In general, the time spent measuring a channel by the remote node is on the order of scores of ms or longer. In this case, it is difficult to reflect short-term fading in transmission of the signal for the random access. Accordingly, the remote node according to an embodiment of the present disclosure uses a result of the measurement of an instantaneous channel state instead of a result of the measurement of a channel state for a long time. That is, the remote node measures the channel based on reference signals received during some of entire time intervals for the channel measurement. The instantaneous channel state measured by the remote node corresponds to a channel state within a very short time at a level of several ms. The instantaneous channel state corresponds to a channel state for a very short time, so that the channel state for the corresponding time does not significantly change.

In a fast fading environment in which a channel state rapidly changes due to movement of the remote node, the range of fluctuation in the channel state is wide, and thus the remote node determines a channel state for a very short period to perform the instantaneous channel measurement. The channel measurement in the fast fading environment may use only a reference signal received during a short time interval. According to embodiments, the remote node may perform the instantaneous channel measurement in the fast fading environment through a scheme such as reference signal time interpolation (RSTI) for linear interpolation between time intervals during which reference signals are received or minimum mean square error (MMSE).

Figure 4:
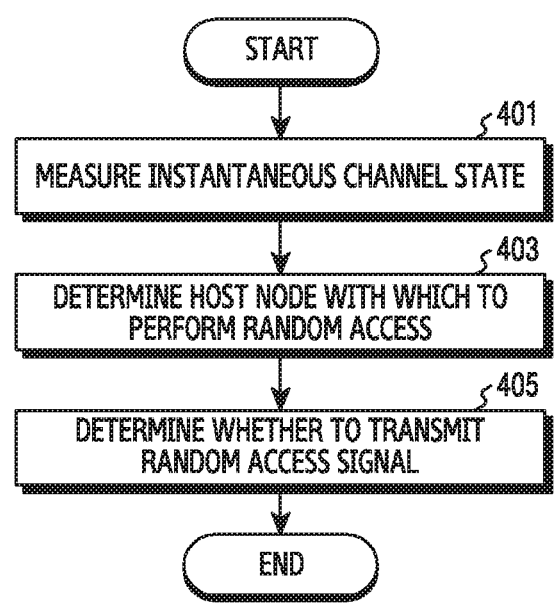
FIG. 4 illustrates an example of a flow of operations of the remote node that performs random access according to embodiments of the present disclosure.

FIG. 4 illustrates an example of a flow of operations of the remote node that performs random access according to embodiments of the present disclosure.

Referring to FIG. 4, the remote node measures an instantaneous channel state in step 401. The instantaneous channel state may be the state of a channel measured based on a reference signal received for a relatively short term. In other words, the instantaneous channel state may be a state of a channel that reflects short-term fading. The instantaneous channel state may be different from the state of a channel measured based on a reference signal received for a relatively long term. For example, the short term may refer to a period less than 10 ms and the long term may refer to a period of about scores of ms. In order to consider the fast fading environment, the remote node may receive reference signals for the channel measurement from a plurality of host nodes for the short term. The remote node may determine information indicating instantaneous channel states between the plurality of host nodes and the remote node based on the received reference signals. For example, the information indicating the instantaneous channel state may be a channel gain or channel quality for the instantaneous channel.

In some embodiments, the time interval for the channel measurement may be differently set depending on the capacity of data that the remote node desires to transmit or an expected access time with the host node. In other words, when the capacity of data that the remote node desires to transmit is very small or when wireless access for the short term is required, the remote node only has to access the host node during a short time interval, so that the remote node measures the channel state during the short time interval instead of measuring the channel state during a long time interval. In reverse, when the capacity of data that the remote node desires to transmit is large or when wireless access for the long term is required, the remote node measures the channel state during the long time interval. For example, when the remote node corresponds to a meter in an IoT environment, the remote node only has to transmit scores of bits of data once a month, so that the remote node only measures the channel at a level of several ms instead of measuring the channel for the long term. In contrast, when the remote node requires the transmission/reception of high capacity of data for a long time, such as for a video call, the remote node measures the channel for a time of scores of ms or longer.

In step 403, the remote node determines a host node with which to perform random access. The remote node may determine the host node with which to perform random access based on information acquired through the channel measurement. The remote node located in a cell boundary area, that is, a handover area, is required to select a proper host node to increase a random access success possibility and minimize interference that may influence another host node or the remote node.

The remote node may determine the host node with which to perform the random access among a plurality of host nodes based on the determined instantaneous power state. The plurality of host nodes may be host nodes that transmit reference signals to the remote node. In some embodiments, the plurality of host nodes may be candidate host nodes which the remote node filters through reference signals received for the long term. For example, in order to determine the host node with which to perform the random access, the remote node may receive the reference signals for the long term. The remote node may determine the plurality of host nodes with which to perform the random access among neighboring host nodes based on the reference signals received for the long term. The remote node may determine the states of channels between the plurality of host nodes and the remote node based on the reference signals received from the plurality of determined host nodes for the short term. The remote node may determine one host node with which to perform the random access among the plurality of host nodes based on the determined states of the channels, as in step 403.

For example, when the remote node receives reference signals from a first host node and a second host node for a relatively short term, the remote node may determine a first channel gain as information indicating the state of a channel between the first host node and the remote node and determine a second channel gain as information indicating the state of a channel between the second host node and the remote node in step 401. When the determined first channel gain is 0.5 and the determined second channel gain is 0.7, the remote node may determine the second host node having a larger channel gain as the host node to perform the random access in step 403.

In step 405, the remote node determines whether to transmit a signal for random access to the host node determined in step 403. In order to prevent unnecessary random access from being performed (that is, in order to avoid performing random access determined to have a high failure probability), the remote node may determine whether to transmit the signal for the random access based on information indicating the state of the channel between the remote node and the determined host node.

Only when the channel gain with the host node determined to perform the random access is larger than or equal to a threshold value may the remote node transmit the signal for the random access to the determined host node. For example, when the threshold value for transmission of the signal for the random access is 0.5 and the channel gain between the determined host node and the remote node is 0.7, the remote node may determine to transmit the signal for the random access to the determined host node through an uplink channel. In another example, when the threshold value for transmission of the signal for the random access is 0.5 and the channel gain between the determined host node and the remote node is 0.4, the remote node may wait without transmitting the signal for the random access.

When a transmission condition is not met, the remote node may wait until the transmission condition is met without transmitting the signal for the random access. In other words, the remote node receives the reference signal for the channel measurement from the determined host node until the state of the channel between the determined host node and the remote node meets the transmission condition of the signal for the random access and measures the state of the channel with the determined host node based on the received reference signal. For example, when the remote node selects the first host node as the host node having the best channel state but the state of the channel to the first host node does not meet the transmission condition, the remote node measures the state of the channel with the first host node based on the reference signal received from the first host node during the next time interval, and when the measured state of the channel meets the transmission condition, transmits the signal for the random access to the first host node.

In other embodiments, when the transmission condition is not met, the remote node may re-select the host node based on the reference signals received from the plurality of host nodes during the next time interval and determine whether the transmission condition is met with respect to the re-selected host node. For example, when the remote node initially selects the first host node but the state of the channel of the first host node does not meet the transmission condition, the remote node may measure the reference signals received from the plurality of host nodes during the next time interval, select the second host node, corresponding to another host node, and determine whether the transmission condition is met. Meanwhile, according to embodiments, when the transmission condition is not met, the remote node may determine whether to re-select the host node or to continuously measure the channel with respect to the selected host node according to the difference in the channel measurement value between the plurality of host nodes.

When the transmission condition is met, the remote node may transmit the signal for the random access to the selected host node. When the signal for the random access is transmitted to the host node and the random access is successful, the remote node may transmit data, which the remote note desires to transmit, to the host node through an uplink. When the random access is not successful, the remote node may perform the steps illustrated in FIG. 4 again.

Step 403 and step 405 may be performed sequentially as illustrated in FIG. 4 or simultaneously.

Through the procedure in steps 401 to 405, the remote node may not make an attempt at random access having a relatively high failure probability. The remote node may selectively perform random access according to a channel state, thereby reducing power consumption for the random access. Further, through the operation in steps 401 to 405, the system including remote notes that perform an operation that is substantially the same as or similar to that of the remote node may secure a high random access success rate. In addition, through the operation in steps 401 to 405, it is possible to reduce unnecessary random access and thus to improve random access success rates of other remote nodes that attempt general random access.

Figure 5:
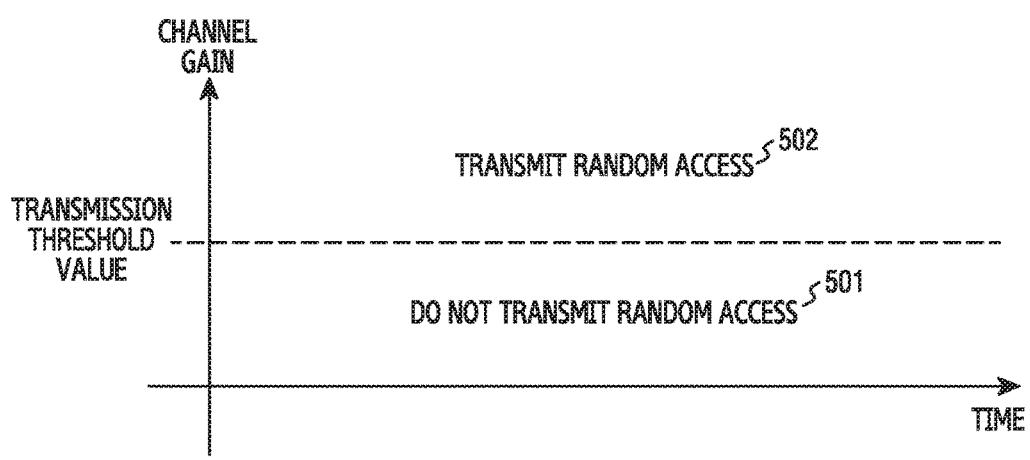
FIG. 5 illustrates an example of a transmission condition for transmitting a signal for channel adaptive random access according to embodiments of the present disclosure.

FIG. 5 illustrates an example of a transmission condition for transmitting a signal for channel adaptive random access according to embodiments of the present disclosure. FIG. 5 illustrates an embodiment of a reference for determining whether the remote node meets the transmission condition in step 405 of FIG. 4.

The transmission of the signal for the channel adaptive random access used in the present disclosure is described through FIG. 5. Referring to FIG. 5, there is a threshold value for the channel adaptive random access. The threshold value corresponds to a value used for determining whether to transmit the signal for the random access by the remote node. The threshold value may be set differently depending on a value indicating a channel state. For example, when the value indicating the channel state corresponds to a channel gain, the threshold value may be set as 0.5. In another example, when the value indicating the channel state corresponds to an SINR, the threshold value may be set as 0.9. In another example, FIG. 5 illustrates an example in which, when the value indicating the channel state corresponds to an SINR, the threshold value may be set as 0.9. The remote node transmits the signal for the random access when the channel gain acquired through the channel measurement is larger than or equal to the threshold value, and does not transmit the signal for the random access when the channel gain is smaller than the threshold value.

The embodiment of FIG. 5 illustrates the case where the threshold value has a predetermined value depending on the time. However, the transmission threshold value may vary depending on the time in an embodiment. In some embodiments, when the remote node does not desire to wait for a long time until a channel state becomes good for random access, the threshold value for the random access may be set to be reduced according to the time. For example, the transmission threshold value marked by dotted lines in FIG. 5 may be linearly reduced. Alternatively, the dotted lines in FIG. 5 may be lowered every predetermined time interval. The transmission threshold value for determining whether to transmit the signal for the random access according to the necessity of the remote node may be differently set depending on the time. By the settings of the transmission threshold value, the remote node may increase a random access success probability by transmitting the signal for the random access when the channel state is at a predetermined level or higher, and may also reduce an excessive waiting time for the random access.

The transmission threshold value for determining whether to transmit the signal for the random access may be variously set. In some embodiments, the threshold value may be differently set according to the amount of data that the remote node desires to transmit. When the amount of data that the remote node desires to transmit is large, the remote node is required to transmit a large capacity of data when the channel state is relatively good. Accordingly, the threshold value may be set to be large when the remote node desires to transmit a large amount of data, and the threshold value may be set to be small when the remote node desires to transmit a small amount of data. In other embodiments, the threshold value may be differently set according to information on a transmission quality requirement (e.g., a service quality or quality of service (QoS)) of data that the remote node desires to transmit. For example, when the data that the remote node desires to transmit corresponds to a packet for a voice call (e.g., voice over LTE (VoLTE)), transmission quality at a high level is needed. When the remote node performs random access to transmit data requiring a transmission quality at a high level, the transmission threshold value may be set to be relatively large. In another embodiment, the remote node may set the transmission threshold value according to the number of adjacent remote nodes. The remote node may identify the number of remote nodes adjacent to the remote node from signals received from the host node or the adjacent remote nodes. When the number of adjacent remote nodes is large, it is considered that there is a strong likelihood of an attempt to perform random access to the same host node by adjacent remote nodes, so that the probability of failure of random access by the remote node becomes higher. Accordingly, when the number of adjacent remote nodes is large, the remote node may set the transmission threshold value to be large. By transmitting the signal for the random access when the channel state is good, the remote node may increase the random access success probability of the remote node even when the number of adjacent remote nodes is large.

In the general time division duplexer (TDD) communication scheme, the remote node may estimate (or determine) an uplink channel state by measuring a downlink channel state according to channel reciprocity. That is, in the TDD communication system, the remote node may estimate (or determine) the uplink channel state based on the reference signal received from the host node through the downlink channel. Based on information on the measurement of the uplink channel state, the remote node transmits the signal for the random access only when the channel state is good, and does not transmit the signal for the random access otherwise. The remote node operates in an idle state instead of transmitting the signal for the random access, thereby saving transmission power required for transmitting the signal for the random access without performing random access having a low success probability.

The present disclosure proposes a scheme for adaptively transmitting a signal for random access according to a channel state in order to efficiently perform random access by a remote node located in a boundary area within the coverage of a plurality of host nodes. The boundary area may be a boundary area between cells in a wireless communication system. For example, the boundary area may be a handover area. Since the remote node located in the boundary area is generally farther from the host node, the remote node that desires to perform random access is required to transmit the signal for the random access at lower power. Further, when the remote node transmits the signal for random access with excessively high power, the signal for random access may cause large interference with another host node, and thus it is necessary for the remote node to transmit the signal for random access with low power.

The present disclosure proposes a scheme for selecting a host node having an optimal channel state in consideration of variation in a channel over time and performing the random access to the selected host node with minimum power by a remote node located in a cell boundary area.

Figure 6:
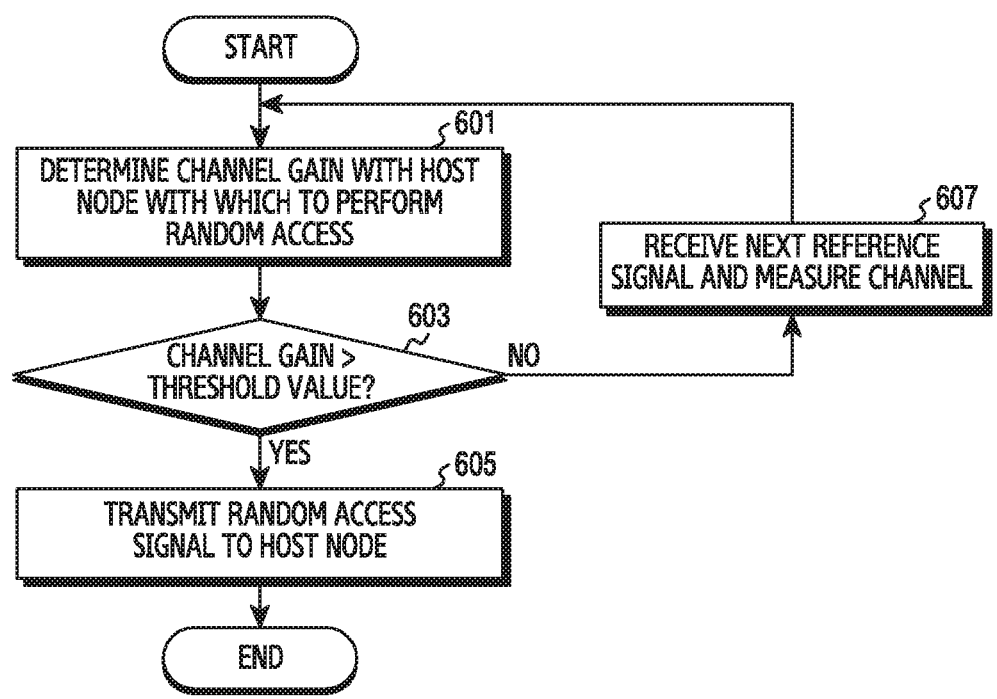
FIG. 6 illustrates an example of a flow of operations of the remote node for determining whether to transmit a signal for random access according to embodiments of the present disclosure.

FIG. 6 illustrates an example of a flow of operations of the remote node for determining whether to transmit a signal for random access according to embodiments of the present disclosure.

Referring to FIG. 6, in step 601, the remote node determines a channel gain value for a channel to a host node with which to perform random access. In step 601, a process of determining the host node with which to perform the random access may be performed in substantially the same or a similar method as that in the operation of step 403 of FIG. 4. Further, although step 601 illustrates the process of determining the channel gain to determine the host node with which to perform the random access, various indexes having a similar characteristic as the channel gain may be used in step 601. For example, the remote node may use a channel quality value such as an SINR instead of the channel gain. When another index is used instead of the channel gain, a threshold value in step 603 may be changed to another value corresponding to the other used index.

In step 603, the remote node determines whether the determined channel gain value is larger than the threshold value. In other words, the remote node determines whether the state of the channel with the determined host node is higher than or equal to a predetermined level. When the channel state is higher than or equal to the predetermined level, the remote node determines a value indicating the channel state (e.g., channel gain) to transmit the signal for the random access and compares the determined value indicating the channel state with the threshold value in order to increase a random access success probability. When the determined channel gain is larger than the threshold value, the remote node may perform a process (or operation) of step 605. Unlike this, when the determined channel gain is equal to or smaller than the threshold value, the remote node may perform a process (or operation) of step 607.

In step 605, the remote node transmits the signal for the random access to the selected host node. In other words, in response to the determination that the determined channel gain is larger than the threshold value, the remote node determines to transmit the signal for random access to the determined host node. Since the signal for random access is transmitted when the channel state is good, the random access failure possibility due to channel fading may become lower. Accordingly, the host node may receive the signal for the random access with the low probability. In other words, through the operation of steps 601 and 603, the random access of the remote node may have a relatively high success probability.

In step 607, the remote node receives a reference signal during the next time interval and measures a channel. In response to the determination that the channel state is equal to or lower than the predetermined level in step 603, the remote node waits without transmitting the signal for the random access. When the channel state is not good, the signal for the random access is highly likely to be transmitted with insufficient intensity or quality due to channel fading. For example, the random access signal may be transmitted with an intensity equal to or smaller than a predetermined signal strength or may have a quality equal to or smaller than a predetermined SINR due to channel fading. The signal for the random access transmitted with the insufficient intensity or quality due to the channel fading may not reach the determined host node. Further, even if the signal for the random access transmitted with insufficient intensity or quality due to channel fading reaches the host node, the signal for the random access may fail to be decoded in the host node because of the insufficient intensity or quality. The remote node may prevent unnecessary power consumption generated by the random access by not transmitting the signal for the random access when the channel state is not good. Further, the remote node may reduce interference that may influence another entity and increase a random access success probability for the host node of another remote node by not transmitting the signal for the random access when the channel state is not good. Through the transmission of the signal for the channel adaptive random access as described above, the performance of the entire system can be improved.

After step 607, in some embodiments, the remote node may proceed to step 601 of FIG. 6 to acquire the channel gain value for the determined host node again and to determine whether to perform random access with the corresponding host node. In other embodiments, the remote node may run parallel with a process of selecting a set of candidate host nodes to which the signal for random access is to be transmitted again on the basis of channel measurement.

Figure 7:
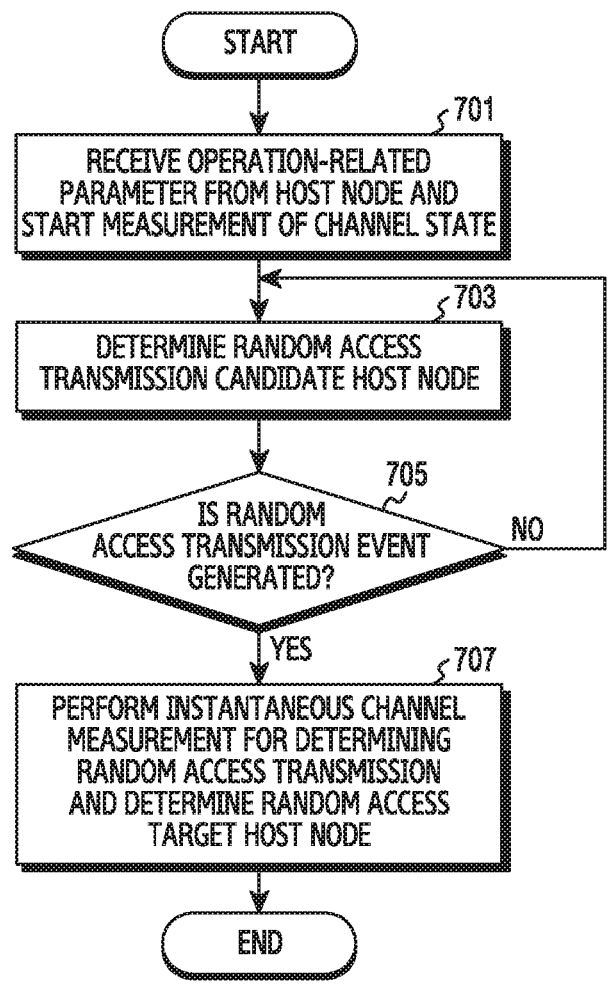
FIG. 7 illustrates an example of a flow of operations of the remote node for determining a target host node for random access through instantaneous channel measurement according to embodiments of the present disclosure.

FIG. 7 illustrates an example of a flow of operations of the remote node for determining a target host node for random access through instantaneous channel measurement according to embodiments of the present disclosure.

Referring to FIG. 7, in step 701, the remote node receives an operation-related parameter from the host node and measures a channel state. The parameter may include information on the host node. In some embodiments, the parameter may include an ID of the host node or information on a random-access channel. For example, when a communication system to which the remote node and the host node belong is an LTE standard communication system, the remote node may receive information on a random access configuration from the host node. The remote node may identify the host node having transmitted the operation-related parameter based on the parameter. Further, the remote node may perform random access using the parameter.

In step 703, the remote node determines a candidate host node for the random access. The remote node may determine the candidate host node based on the measured channel state. The measured channel state may be the long-term state of a channel (e.g., scores of ms or longer). Based on the long-term state of the channel, the remote node determines the candidate host node to which a signal for random access is to be transmitted.

In step 705, the remote node determines whether a transmission event of the signal for the random access is generated. The transmission event of the signal for the random access may be an event requiring random access, such as initial access to the host node or a handover event.

The reference for determining the candidate host node may be various. In some embodiment, a host node having a channel gain larger than or equal to a predetermined reference value may be determined as the candidate host node. In other embodiments, a predetermined number (e.g., Nc) of host nodes may be sequentially determined as the candidate host node according to an order of a higher channel gain. In some embodiments, when the random access event is not generated, the remote node may wait in a state where only the candidate host node is determined until the transmission event of the signal for the random access is generated.

When the transmission event of the signal for the random access is generated in step 705, the remote node may determine whether to transmit the random access to the random access target host node through the instantaneous channel measurement in step 707. In step 707, the remote node measures an instantaneous channel state of a time interval, that is, a term (e.g., several ms) shorter than a time for determining the candidate host node. Thereafter, the remote node determines the target host node with which to perform random access based on the instantaneous channel state. In step 707, the target host node with which to perform random access may be selected from the candidate host node set determined in step 703. Further, when the state of step 707 is maintained for a long time since the transmission condition is not met, the remote node may additionally update the candidate host node set to which the signal for the random access is transmitted by measuring the states of channels with the host nodes in step 707.

Figure 8:
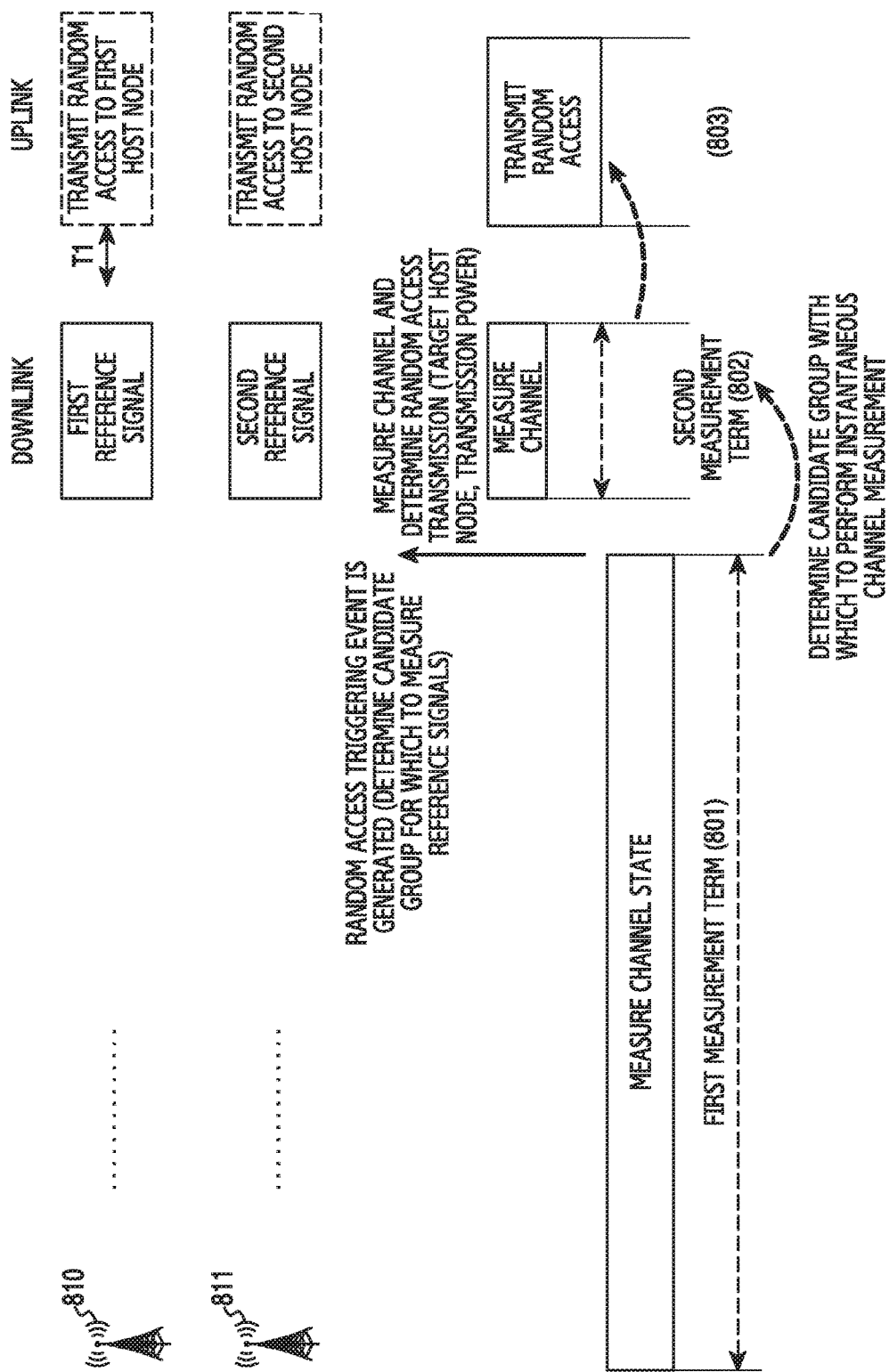
FIG. 8 illustrates an example of a procedure for transmitting a signal for random access through an instantaneous channel measurement according to embodiments of the present disclosure.

FIG. 8 illustrates an example of a procedure for transmitting a signal for random access through instantaneous channel measurement according to embodiments of the present disclosure. FIG. 8 illustrates an example of a method of operating the remote node. At this time, the remote node is located in a cell boundary between a plurality of host nodes including a first host node 811 and a second host node 812.

Referring to FIG. 8, the remote node measures the states of channels between the plurality of host nodes and the remote node based on reference signals received from the plurality of host nodes including the first host node 811 and the second host node 812 for a first measurement tem 801. The first measurement term corresponds to a long time interval of scores of ms or longer, and the channel state measured by the remote node corresponds to a channel state for a relatively long time. Based on the channel state measured for the first measurement term, the remote node determines the candidate host node of which the instantaneous channel state for random access is measured among the plurality of host nodes. It is because the host node having a good channel state for a long time interval is highly likely to have a good instantaneous channel state. The reference for determining the candidate host node may vary depending on the embodiment. FIG. 8 illustrates an example of the case where Nc=2 (Nc is the number of candidate host nodes), that is, two host nodes are determined as candidate host nodes. In some embodiments, after measuring the channel state for the first measurement term, the remote node determines whether a random-access triggering event is generated. In other embodiments, after the random-access triggering event is generated, the remote node may measure the channel during a long time interval and determine the candidate host node.

After determining the candidate host node on which to perform the instantaneous channel measurement, the remote node measures an instantaneous channel state for the candidate host node based on a reference signal received from the determined candidate host node for a second measurement term 802. The second measurement term 802 corresponds to a term shorter than the first measurement term 801 and the channel state measured by the remote node corresponds to a channel state within a very short time of several ms. The channel state is not significantly changed for the first measurement term 801.

The second measurement term 802 may be variously set. In some embodiments, when the capacity of data that the remote node desires to transmit is large, the second measurement term 802 may be set to be long. In other embodiments, the second measurement term 802 may be set according to the degree of change in the channel. When the movement speed of the remote node or Doppler shift is large, the second measurement term 802 may be set to be short.

In other embodiments, the remote node may perform another short-term channel measurement at a predetermined time after the second measurement term 802 ends. At this time, the term for which the short-term channel measurement is performed may be set to be equal to the second measurement term 802. In other embodiments, the remote node may variably set the term for which the short-term channel measurement is performed over time.

In other embodiments, the first measurement term 801 and the second measurement term 802 may be separately set. In this case, an interval between the first measurement term 801 and the second measurement term 802 may be controlled according to Doppler shift. For example, since it may be considered that the degree of a change in the channel is large when a Doppler shift is large, the candidate host node determined in the first measurement term 801 may be set to be an effective candidate host node in the second measurement term 802 by shortening an interval between the first measurement term 801 and the second measurement term 802

The remote node determines the target host node to which the signal for random access is to be transmitted and whether to transmit the signal for the random access based on the channel state measured for the second measurement term 802. The target host node and whether to transmit the signal for the random access may be determined simultaneously or sequentially. Additionally, the remote node may determine the power for transmitting the signal for the random access based on the state of the channel with the determined host node. When the remote node determines the first host node 811 as the host node for the random access and the channel gain with the first host node 811 is larger than or equal to a threshold value (that is, when the remote node determines to transmit the signal for the random access to the first host node 811), the remote node may determine power for transmitting the signal for the random access to the first host node based on the channel gain with the first host node 811. For example, when the channel gain with the first host node 811 is not large even though the channel gain is larger than or equal to the threshold value, in other words, when the channel gain is smaller than another threshold value, the remote node may set transmission power of the signal for the random access to be relatively large and transmit the signal. In another example, when the channel gain between the first host node 811 and the remote node is large, the remote node may transmit the signal for the random access with relatively lower power. By controlling the power according to the channel state, the remote node may efficiently manage the power for the random access.

In some time intervals 803 of the uplink transmission time slots, the remote node transmits the signal for the random access to the determined host node. For example, the time interval for transmitting the signal for the random access may be after a time of T1 from an end time point of a downlink slot. By determining the target host node and controlling the transmission power based on the instantaneous channel state, the remote node may reduce power consumption. Further, by determining the target host node and controlling the transmission power based on the instantaneous channel state, the remote node may reduce interference that influences another host node, such as the second host node 812 or other remote nodes. The remote node transmits the signal for random access to the first host node 811 only when the channel state is good, thereby increasing the success probability of the random access with the first host node 811. The remote node avoids transmitting the signal for the random access to the first host node 811 only when the channel state is bad, thereby increasing random access success probabilities of other remote nodes in competition-based random access without interference with the other remote nodes received through the random-access channel of the first host node.

Figure 9:
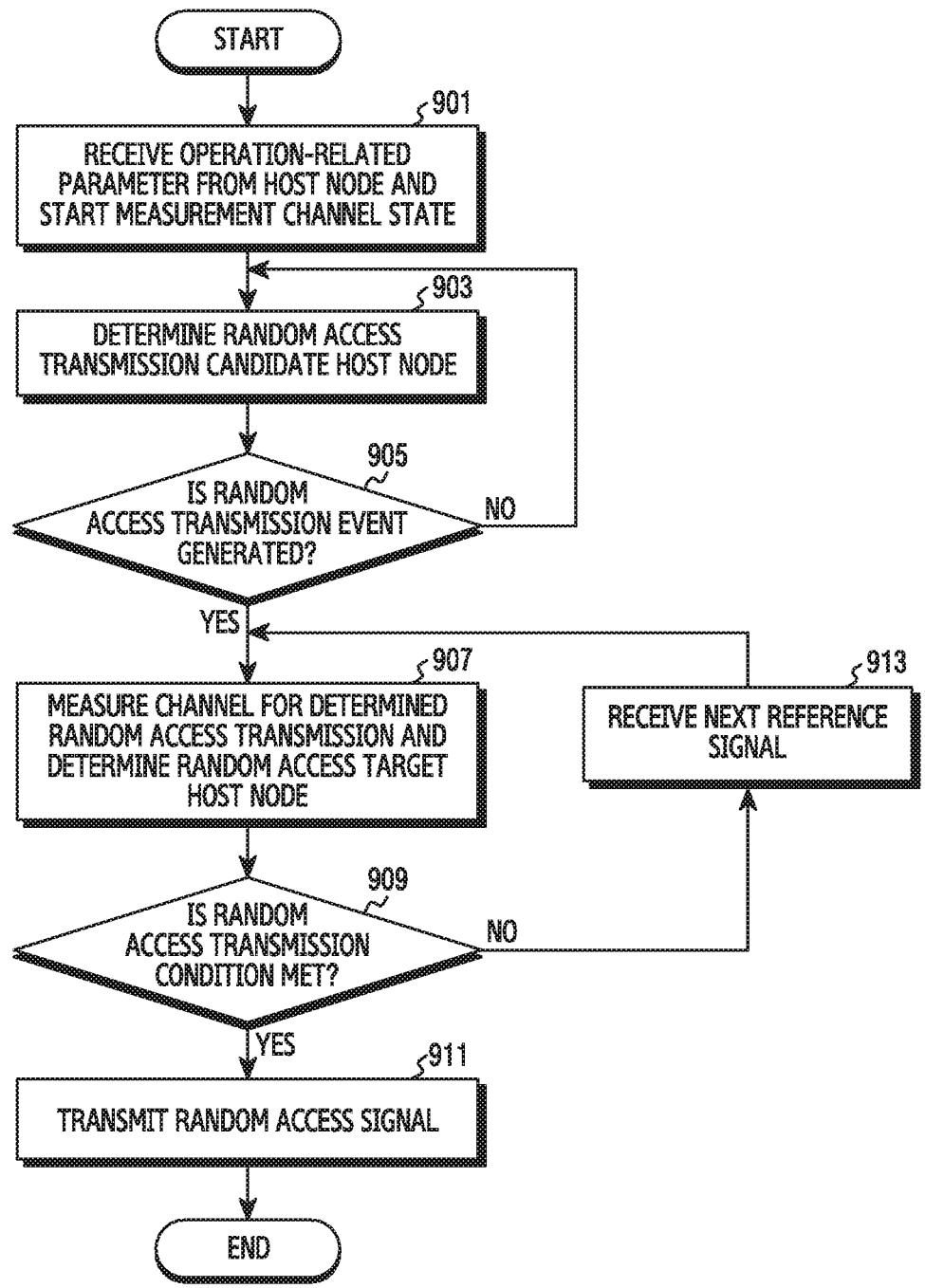
FIG. 9 illustrates an example of a flow of operations of the remote node for transmitting a signal for random access through an instantaneous channel measurement according to embodiments of the present disclosure.

FIG. 9 illustrates an example of a flow of operations of the remote node for transmitting a signal for random access through an instantaneous channel measurement according to embodiments of the present disclosure. Steps 901 to 909 of FIG. 9 may correspond to steps 701 to 709 of FIG. 7, and steps 911 to 915 of FIG. 9 may correspond to steps 603 to 607 of FIG. 6. In each step of FIG. 9, the remote node may perform an operation substantially the same as or similar to the operation described in FIGS. 6 and 7.

In step 901, the remote node receives an operation-related parameter from the host node and measures a channel state. In step 903, the remote node determines a candidate host node to which a signal for random access is transmitted. In step 905, the remote node determines whether an event for transmitting the signal for the random access is generated. When the event for transmitting the signal for the random access is not generated, the remote node returns to step 903 and determines a candidate host node again. In some embodiments, when the event for transmitting the signal for the random access is not generated in step 905, the remote node may return to step 901 to receive the parameter and a reference signal from the host node and measure the channel state. In other embodiments, when the event for transmitting the signal for the random access is generated, the remote node may determine the candidate host node. In other words, steps 903 and 905 may be interchangeable.

When the event for transmitting the signal for the random access is generated, the remote node proceeds to step 907. In step 907, the remote node determines a random access target host node and whether to transmit the signal for the random access. In step 909, the remote node determines whether a condition for transmitting the signal for the random access is met. When the condition for transmitting the signal for the random access is met, the remote node proceeds to step 911 and transmits the signal for the random access to the host node with which it has been determined to perform random access. When the condition for transmitting the signal for the random access is not met, the remote node proceeds to step 913 and receives the reference signal for the next random access attempt. In some embodiments, the remote node may proceed to step 901 or 903 instead of step 913. In this case, the remote node may select the candidate host node for the random access again. At this time, the event for transmitting the signal for the random access has already been transmitted, so that the remote node may determine whether to transmit the signal for the random access while selecting transmission candidate host nodes and measuring channels for a short time with respect to the candidate host nodes. Proceeding to step 901 instead of step 913 by the remote node may be performed on a predetermined period.

Figure 10:
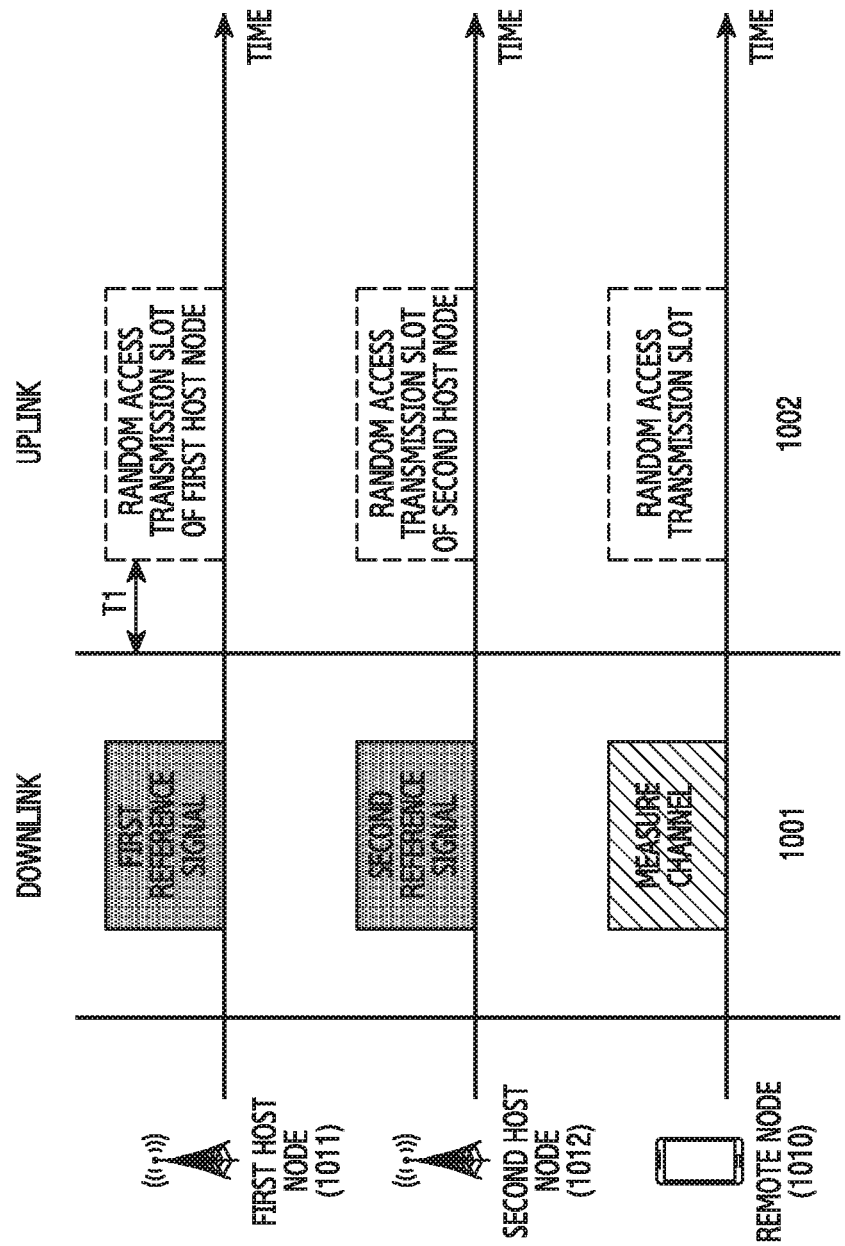
FIG. 10 illustrates an example of a time slot when signals for random access are transmitted at the same time point in a time division duplex (TDD) wireless communication system according to embodiments of the present disclosure.

FIG. 10 illustrates an example of a time slot when signals for random access are transmitted at the same time point in a TDD wireless communication system according to embodiments of the present disclosure.

Based on the TDD communication scheme, a downlink and an uplink are divided according to time within the same frequency domain. In some embodiments, the ratios of time intervals for the uplink and the downlink may vary. For example, uplink time interval length:downlink time interval length=7:3. Referring to FIG. 10, in the TDD communication system, all signals transmitted by host nodes are temporally synchronized. The time synchronization between host nodes can be achieved through global positioning system (GPS) or network synchronization. Further, when one base station services a plurality of sectors, the time synchronization may be acquired without an additional operation.

Each of the host nodes may transmit a reference signal for measuring a channel to the remote node through the downlink. The remote node may measure the state of the channel based on the received reference signal. At this time, a remote node located in a cell boundary area receives reference signals from a plurality of host nodes and measures the state of a channel with each host node based on each reference signal. The remote node may select the host node having the best channel state and transmit a signal for random access. A reference for selecting the host node having the best channel state may be a channel gain, transmission power required for transmitting the signal for successful random access, or the level of the received reference signal. Further, the remote node may determine whether the state of the channel with the host node having the best channel state meets a predetermined transmission condition. When the state of the channel with the host node does not meet the transmission condition, the remote node waits until the state of the channel with the host node meets the transmission condition without transmitting the signal for the random access. In contrast, when the state of the channel with the host node meets the transmission condition, the remote node transmits the signal for the random access during an uplink transmission time interval.

Referring to FIG. 10, two adjacent host nodes transmit reference signals at the same time. Accordingly, the remote node may measure the states of channels with the two host nodes through one-time channel measurement, thereby reducing power consumption consumed in the course of channel measurement.

Referring to FIG. 10, there is a time slot 1002 for transmitting uplink random access after a time of T1 from a downlink end time point. The remote node transmits the signal for the random access in the time slot. In the embodiment of FIG. 10, the temporal location of a time slot in which a remote node 1010 may transmit random access to a first host node 1011 is the same as the temporal location of a time slot in which the remote node 1010 may transmit random access to a second host node 1012. At this time, when the remote node 1010 determines to transmit random access to the first host node 1011, the remote node 1010 transmits the signal for random access to the first host node 1011. When the remote node 1010 determines to transmit random access to the second host node 1012, the remote node 1010 transmits the signal for random access to the second host node 1012. In some embodiments, different sequences may be used in cases where the remote node 1010 transmits the random access to the first host node 1011 and transmits the random access to the second host node 1012, and the host node to which the remote node desires to perform random access may be identified through the different sequences.

In some embodiments, the remote node may simultaneously determine the host node to which the signal for random access is to be transmitted and whether to transmit the signal for the random access based on an instantaneous channel measurement. That is, the remote node may measure a channel within a short time interval in which a channel state is not significantly changed in a short-term fading environment, select a host node with which to perform random access based on a result of the channel measurement within the short time interval, and simultaneously determine whether to transmit a signal for random access to the selected host node. In the embodiment of FIG. 10, the time interval for the channel measurement and the time interval for transmitting the signal for the random access may be variously set. For example, the time interval for transmitting the signal for the random access may be set to be from 1 ms to 10 ms. However, when the signal for the random access may be transmitted a long distance with low transmission power, the time for transmitting the signal for the random access may be set to be longer.

Although it has been described that the time synchronization between host nodes of the TDD system is made in the embodiment of FIG. 10, the scheme for transmitting the signal for the random access according to the present disclosure can be applied to the case where time synchronization between host nodes is not made. In this case, the remote node may measure channels based on a reference signal received from host nodes during a predetermined time window and determine whether to transmit the signal for the random access with the host node to perform the random access.

In some embodiments, when a transmission threshold value is set to a lowest value (substantially 0), the remote node selects an optimal host node with which to perform the random access based on an instantaneous channel state and transmits the signal for the random access to the selected host node.

FIG. 10 illustrates an embodiment in which the remote node transmits the signal for random access to a plurality of host nodes at the same time point when the time synchronization is made in the TDD communication system. Since the remote node transmits the signal for the random access to the plurality of host nodes at the same time point, the remote node may transmit the signal for the random access in the time slot after the channel measurement simply using reference signals without considering transmission timing of the signal for the random access for every host node, thereby reducing the complexity of calculations required by the remote node. However, in this case, more interference may be generated in a particular time interval, or a channel state may not be steady. In consideration of such a case, the time interval for transmitting the signal for the random access to each host node may be differently set.

Figure 11:
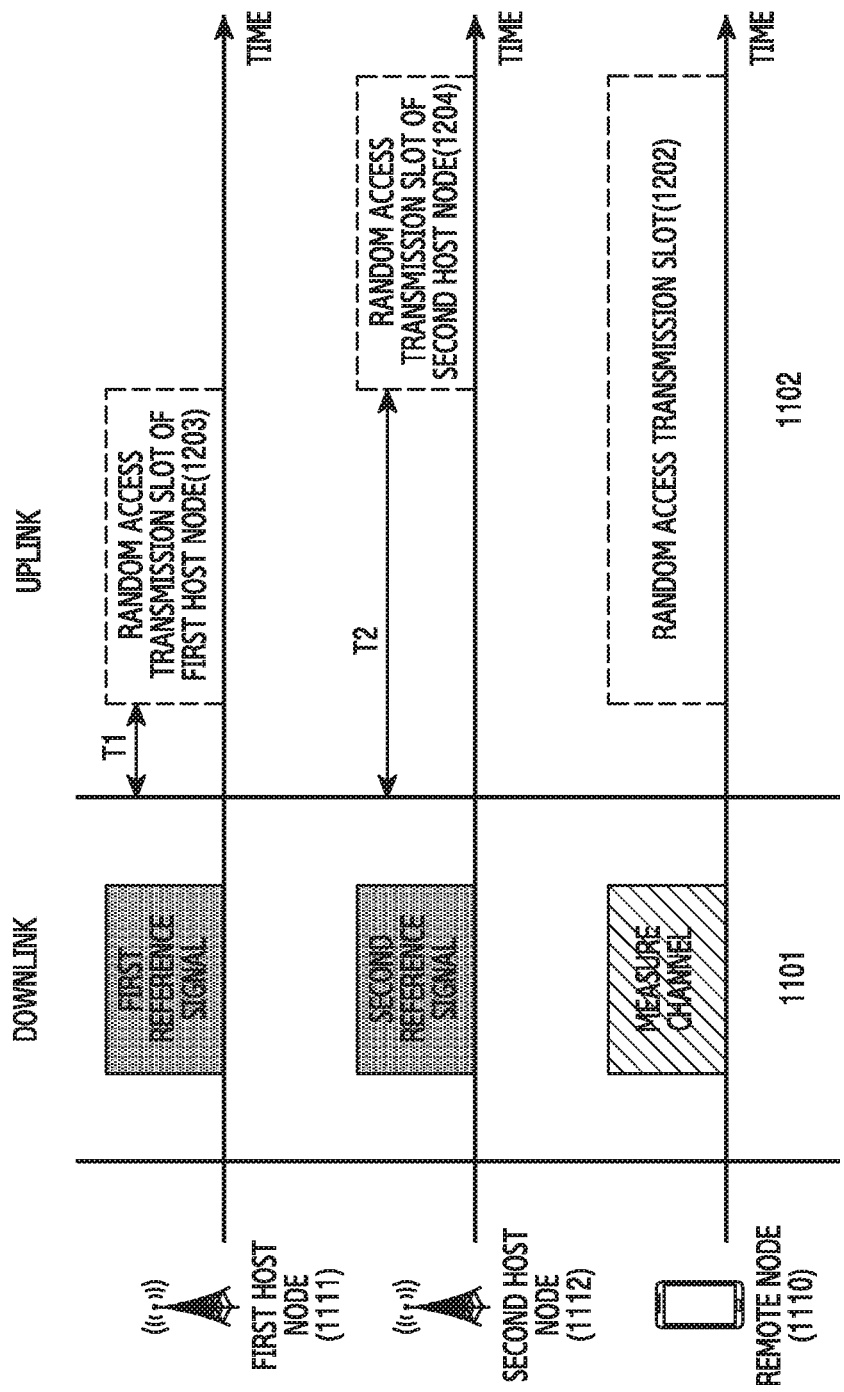
FIG. 11 illustrates an example of a time slot when signals for random access are transmitted at different time points in the TDD wireless communication system according to embodiments of the present disclosure.

FIG. 11 illustrates an example of a time slot when signals for random access are transmitted at different time points in the TDD wireless communication system. Compared to the embodiment of FIG. 10, FIG. 11 illustrates an embodiment in which a transmission slot of the signal for the random access allocated to transmit the signal for the random access by a remote node 1110 is differently set for every host node.

Referring to FIG. 11, time intervals for random access may be differently configured for cases where the remote node 1110 selects a first host node 1111 as the host node with which to perform random access and the remote node 1110 selects a second host node 1112 as the host node with which to perform random access. Specifically, when the remote node 1110 determines to transmit the signal for the random access to the first host node 1111, the remote node 1110 transmits the signal for the random access to the first host node 1111 after T1 from an end of a time slot 1101 for a downlink. When the remote node determines to transmit the signal for the random access to the second host node 1112, the remote node transmits the signal for the random access to the second host node 1112 after T2 from the end of the time slot 1101 for the downlink. In order to transmit the signal for the random access in a different time slot for every host node, the remote node is required to secure a transmission slot 1102 of the signal for random access for all host nodes corresponding to the sum of transmission slots of the signals for the random access for respective host nodes. The transmission slot of the signal for the random access may vary depending on the number of host nodes for the random access.

As illustrated in the embodiment of FIG. 11, it is possible to reduce the amount of interference that may influence each host node by making the remote node transmit signals for random access to different host nodes at different time intervals.

Various embodiments can be applied to the FDD wireless communication system as well as the aforementioned TDD wireless communication system. The FDD wireless communication system corresponds to a system in which an uplink signal and a downlink signal are transmitted through different frequency resources. Compared to the TDD wireless communication system, the FDD wireless communication system has different channels for receiving a reference signal for a channel measurement and transmitting a signal for random access by the remote node based on frequency selectivity. Accordingly, like the TDD wireless communication system, a channel state measured through the reference signal transmitted through the downlink may be different from an uplink channel for transmitting the signal for the random access by the remote node.

In the FDD wireless communication system having different downlink and uplink channels, the host node may transmit the reference signal for the channel measurement through resources allocated for the uplink signal in order to perform instantaneous channel measurement of the remote node. That is, even though the reference signal is a downlink signal, the host node temporarily transmits the reference signal through resources allocated for the uplink signal. In order to not transmit the signal through the uplink during the time interval for transmitting the reference signal, the remote node may define the time interval through the standard or may set the time interval as the host node transmits a control message to the remote node.

The remote node may measure an instantaneous channel state of an uplink channel for transmitting the signal for the random access based on the reference signal received through the uplink channel. Accordingly, the remote node may determine whether to transmit the signal for the random access with the host node to which the random access is transmitted based on the measured instantaneous channel state. When the host node transmits the reference signal corresponding to the downlink signal through the uplink channel, a problem of collision with another uplink signal may occur. But, since the channel state that the remote node desires to measure corresponds to the instantaneous channel state for a very short time, the time spent transmitting the reference signal by the host node is very short, so that there is a very low possibility of occurrence of a collision. In some embodiments, the host node may prevent remote nodes from transmitting signals through corresponding resources during the time for transmitting reference signals based on a negotiation procedure with the remote nodes located in a serving cell, thereby securing uplink resources to transmit the downlink signals.

Meanwhile, before measuring the channel, the remote node may receive information on host nodes from the host nodes and may know when the host node transmits the reference signal through the uplink resources based on the information. At the time point at which the reference signal is transmitted, the remote node may receive the reference signal and measure the state of the channel with each host node. Further, the remote node may be configured not to transmit the uplink channel signal at the time point when the reference signal is transmitted.

When the transmission of the reference signal through the uplink in the FDD system as described in the embodiments of FIGS. 7 to 9 is applied, the host node may transmit the reference signal through downlink resources in order to perform long-term channel measurement of the remote node to select the candidate host node, and may transmit the reference signal through the uplink resources in order to perform instantaneous channel measurement of the remote node to select the host node for random access. Specifically, when measuring the channels to select the candidate host node, the remote node measures the channels based on the reference signals transmitted through the downlink channel even in the FDD system. The reason is that it is not suitable for the host node to use long-term resources in the uplink resources in order to transmit the reference signal corresponding to the downlink signal since the long-term channel measurement to select the candidate host node by the remote node corresponds to a process requiring a relatively long time, a difference between the downlink and the uplink is not large over the long term even though the downlink and the uplink are different in the FDD system, and it is not required to perform very precise channel estimation simply to determine the candidate host node. However, in the instantaneous channel measurement to determine whether to transmit the signal for the random access with the host node to perform the random access, a short time and precise channel measurement are required. Accordingly, the host node may transmit the reference signal through the uplink resources and the remote node may measure the uplink channel through the reference signal received through the uplink resources. However, the remote node may perform the long-term channel measurement based on the reference signal transmitted by the host node through an uplink frequency band. Further, the remote node may perform the long-term channel measurement by using both the reference signal transmitted through a downlink frequency band and a signal transmitted by the host node through the uplink.

Figure 12:
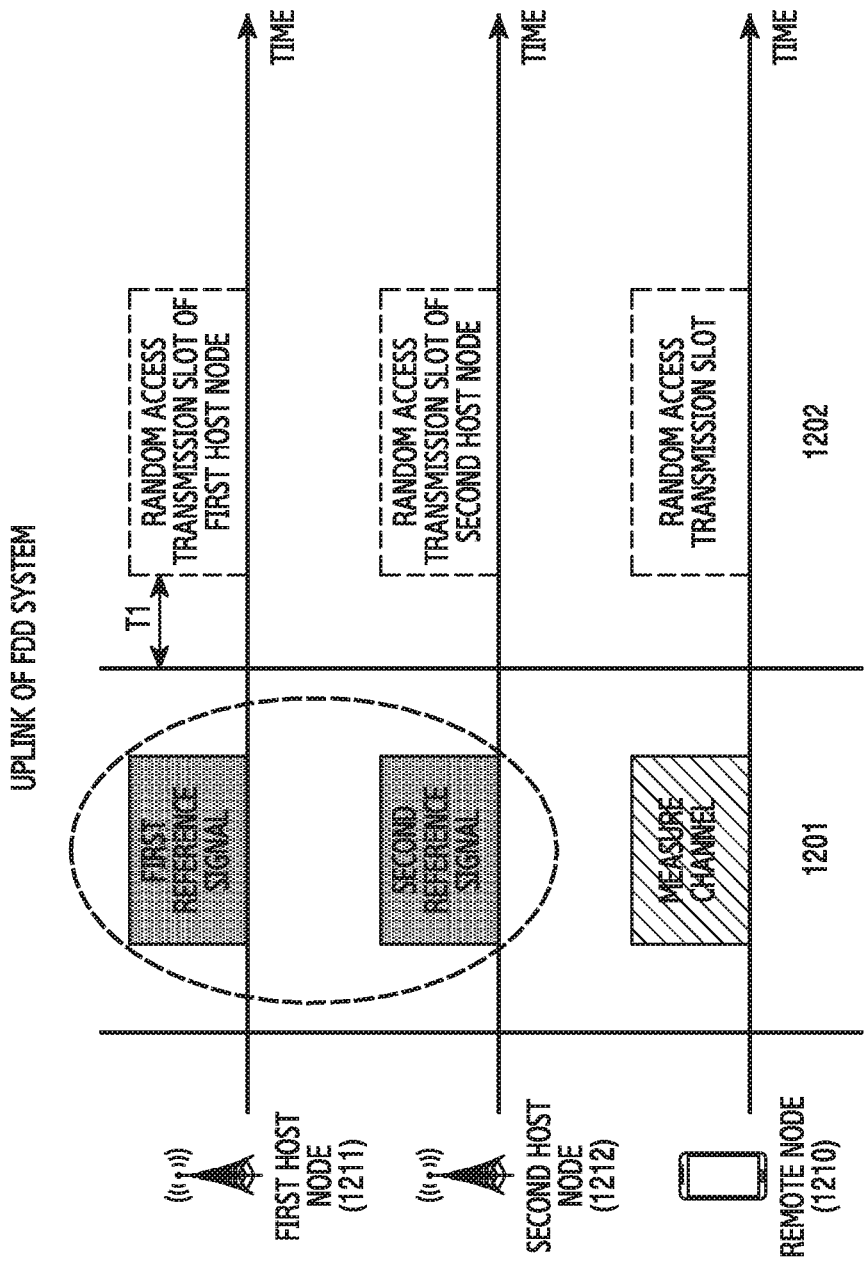
FIG. 12 illustrates an example of a time slot when signals for random access are transmitted at the same time point in an frequency division duplex (FDD) wireless communication system according to embodiments of the present disclosure.

FIG. 12 illustrates an example of a time slot when signals for random access are transmitted at the same time point in the FDD wireless communication system according to embodiments of the present disclosure. FIG. 12 illustrates an uplink of the FDD communication system. Referring to FIG. 12, a first host node 1211 and a second host node 1212 transmit reference signals for measuring channels to the remote node. In some embodiments, the first host node 1211 and the second host node 1212 may transmit reference signals through resources allocated for the uplink. The time point at which the reference signal is transmitted may be predefined between the host node and the remote node.

In FIG. 12, it is assumed that signals transmitted by the host nodes are temporally synchronized. The time synchronization between host nodes can be achieved through global positioning system (GPS) or network synchronization. When one host node services a plurality of sectors, the time synchronization may be acquired without an additional operation.

Referring to FIG. 12, the temporally synchronized first host node 1211 and second host node 1212 respectively transmit a first reference signal and a second reference signal to a remote node 1210 in the same time slot 1201. The remote node 1210 receiving the first reference signal and the second reference signal measures channels for the host nodes. Based on the result of the channel measurement, the remote node may determine whether to transmit a signal for random access with the host node to which the random access is transmitted. When the remote node determines to transmit the signal for random access, the remote node may transmit the signal for random access to the first host node 1211 or the second host node 1212 in a transmission slot 1202 of the signal for random access after T1 from an end of a time interval for the channel measurement.

Since the remote node 1210 transmits the signal for random access to a plurality of host nodes at the same time point, the remote node 1210 may transmit the signal for random access in the time slot after the channel measurement simply using reference signals without considering transmission timing of the signal for random access for every host node, thereby reducing the complexity of calculations required by the remote node 1210. However, in this case, more interference may be generated in a particular time interval, or a channel state may not be steady. In consideration of such a case, the time interval for transmitting the signal for the random access to each host node may be differently set.

Figure 13:
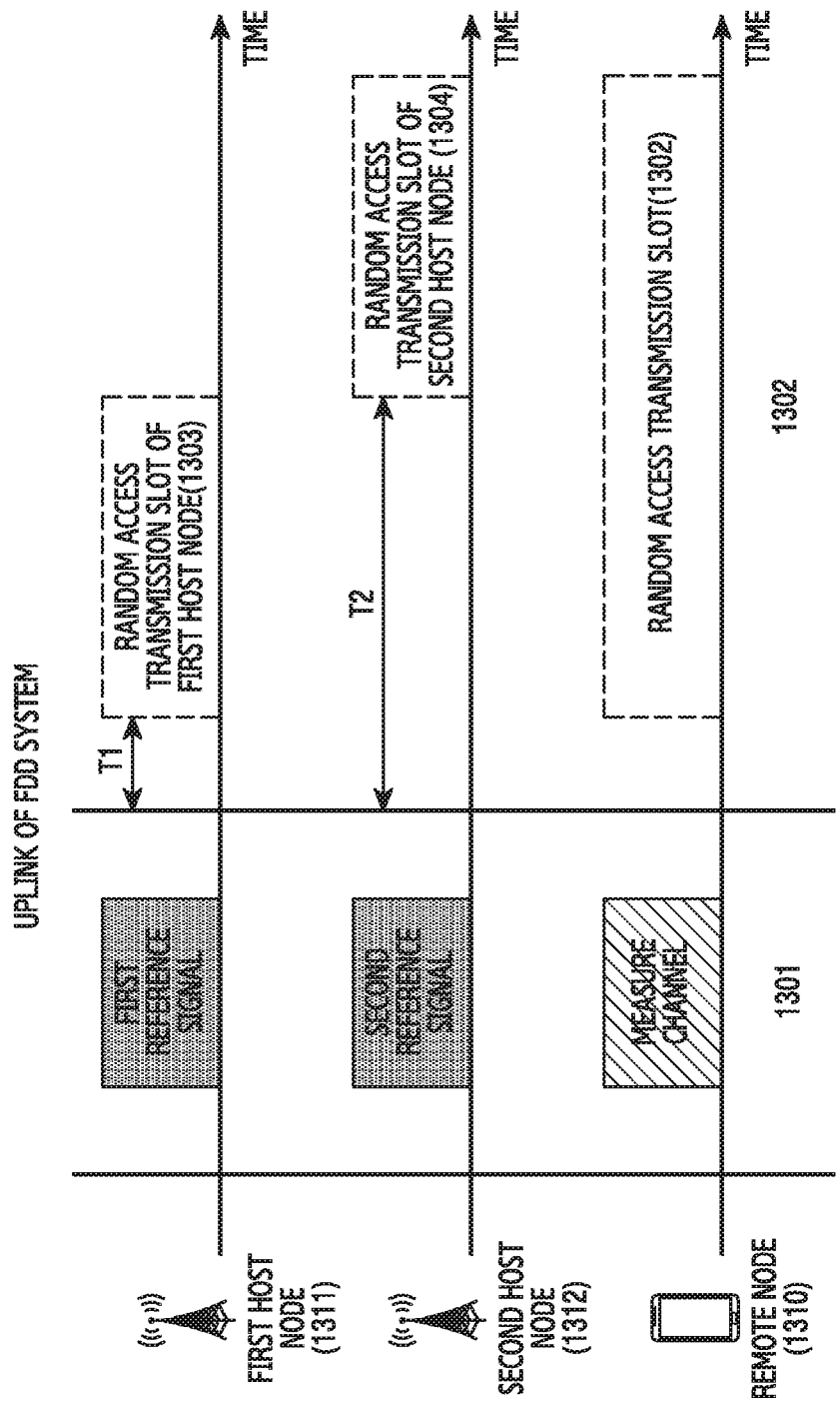
FIG. 13 illustrates an example of a time slot when signals for random access are transmitted at different time points in the FDD wireless communication system according to embodiments of the present disclosure.

FIG. 13 illustrates an example of a time slot when signals for random access are transmitted at different time points in the FDD wireless communication system according to embodiments of the present disclosure. Compared to the embodiment of FIG. 12, FIG. 13 illustrates an embodiment in which a transmission slot of the signal for random access, allocated to transmit the signal for the random access by a remote node 1310, is differently set for every host node.

Similar to FIG. 11 for the TDD wireless communication system, when the remote node 1310 determines to transmit the signal for random access to a first host node 1311, the remote node 1310 transmits the signal for the random access to the first host node 1311 after T1 from an end of a time slot 1301 for the channel measurement. When the remote node 1310 determines to transmit the signal for the random access to a second host node 1312, the remote node 1310 transmits the signal for the random access to the second host node 1312 after T2 from the end of the time interval 1301 for the channel measurement. Similar to the description of FIG. 11, a transmission slot 1302 of the signal for the random access may be variously set according to the implementation.

As described in the embodiment of FIG. 13, the remote node 1310 may transmit the signal for the random access to different host nodes at different time intervals, thereby reducing the amount of interference that may influence each host node.

Figure 14:
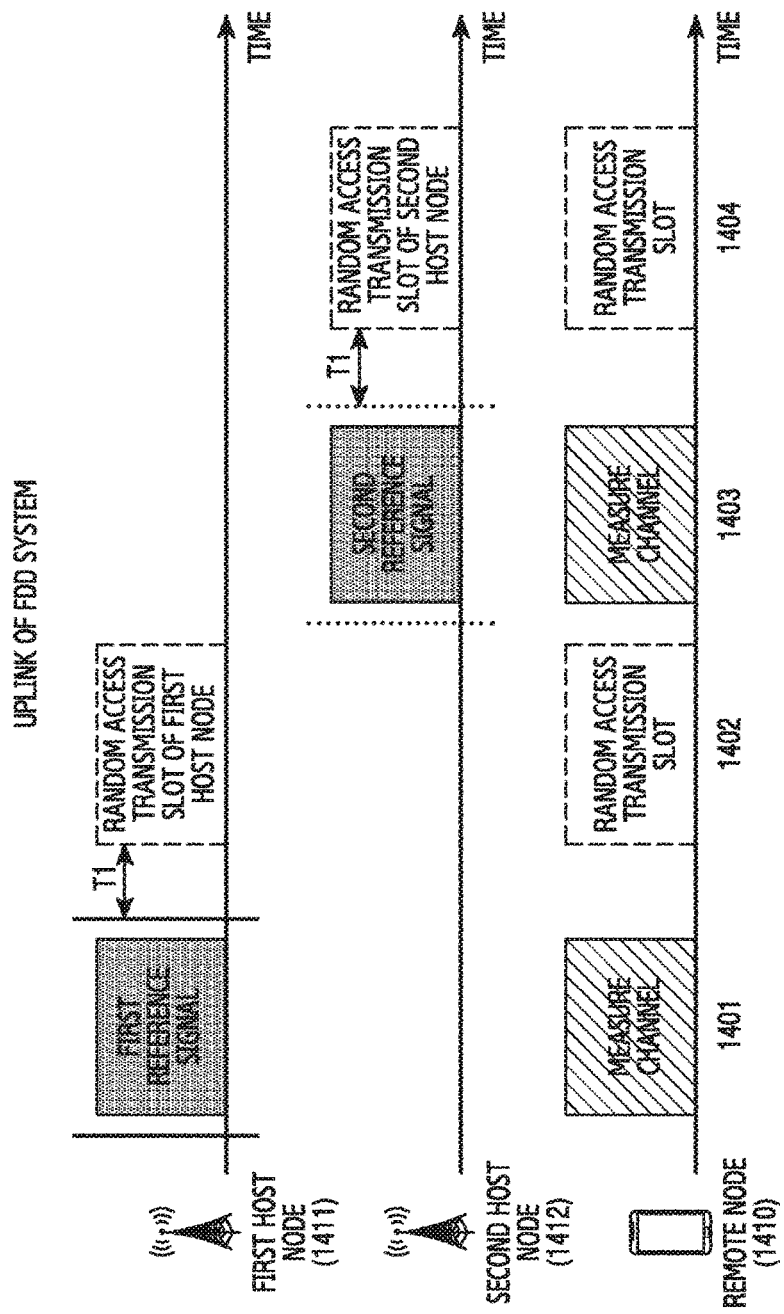
FIG. 14 illustrates an example of a time slot for transmitting a signal for random access when host nodes are not synchronized in the FDD wireless communication system according to embodiments of the present disclosure.

FIG. 14 illustrates an example of a time slot for transmitting a signal for random access when host nodes are not synchronized in the FDD wireless communication system according to embodiments of the present disclosure. A first host node 1411 and a second host node 1412 according to an embodiment of FIG. 14 correspond to temporally nonsynchronized host nodes, so that the host nodes transmit reference signals for channel measurement for different times.

Referring to FIG. 14, every host node has a different time interval for transmitting the reference signal for the channel measurement. Each host node transmits the reference signal for the uplink channel measurement through some time and frequency resources for the uplink signal. A remote node 1410 may acquire information on a host node located close to the remote node 1410 through a host node search procedure and information on a transmission time of the host node. Further, the remote node may be made aware of a transmission time of the reference signal from the acquired information on the transmission time. Specifically, the remote node may know a time interval 1401 in which a first host node 1411 transmits the reference signal and a time interval 1403 in which a second host node 1412 transmits the reference signal from information on pre-acquired reference signal transmission information of the first host node 1411 and the second host node 1412.

The remote node may measure an instantaneous channel state of each host node based on the reference signal transmitted by each host node, and may determine a host node for random access and whether a transmission condition is met based on the measured channel state. Specifically, referring to FIG. 14, a transmission slot 1402 of the signal for random access to the first host node 1411 is located after T1 from a reference signal transmission slot of the first host node 1411, and a transmission slot 1404 of the signal for random access to the second host node 1412 is located after T1 from a reference signal transmission slot of the second host node 1412. When the remote node 1410 determines to transmit the signal for the random access to the first host node 1411, the remote node 1410 transmits the signal for the random access to the first host node 1411 in the transmission slot 1402 of the signal for the random access to the first node 1411. When the remote node 1410 determines to transmit the signal for the random access to the second host node 1412, the remote node 1410 transmits the signal for the random access to the second host node 1412 in the transmission slot 1404 of the signal for random access to the second host node 1412.

In some embodiments, an operation for selecting the host node with which to perform the random access by the remote node 1410 may be performed in advance. In other words, before the time interval 1401 for the channel measurement, the remote node 1410 may pre-determine to receive reference signals from the first host node 1411 and the second host node 1412, which have not been temporally synchronized, during a predetermined time window and to transmit the signal for the random access to the first host node 1411 or the second host node 1412 based on the received reference signals. When the first host node 1411 is selected as the host node to which the signal for the random access is to be transmitted, the remote node transmits the signal for the random access in the transmission slot 1402 of the signal for the random access to the first host node 1411. When the second host node 1412 is selected as the host node to which the signal for the random access is to be transmitted, the remote node transmits the signal for the random access in the transmission slot 1404 of the signal for the random access to the second host node 1412.

Before transmitting the signal for the random access to the determined host node, the remote node 1410 determines whether a transmission condition for the random access is met. When the transmission condition is met, the remote node may transmit the signal for the random access to the corresponding host node. The signal for the random access is transmitted to the transmission slot of the signal for the random access allocated to the host node to which the signal is transmitted, and may be configured using one of sequences corresponding to the host node.

Meanwhile, information on uplink resources for the channel measurement and the random access used in the present disclosure is shared in advance between the host node and the remote node. That is, the host node may broadcast information on the mode in which the system is operating and thus let the remote node know the corresponding information. Further, information on related parameters as well as the information on the operation mode is also broadcasted from the host node and thus is shared between the remote node and the host node.

Figure 15:
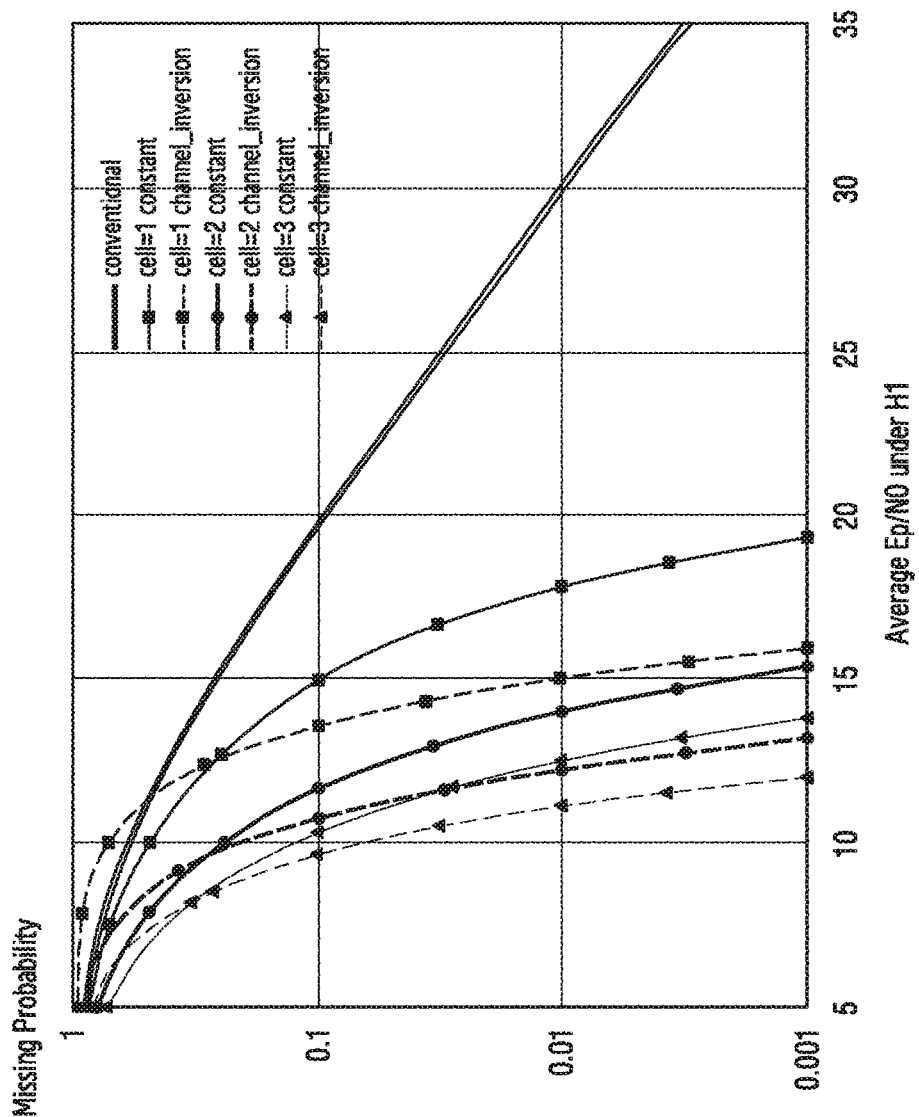
FIG. 15 illustrates an example of a graph showing the performance of transmission of a signal for random access according to embodiments of the present disclosure.

FIG. 15 illustrates an example of a graph showing the performance of transmission of a signal for random access according to embodiments of the present disclosure.

Referring to FIG. 15, a horizontal axis of the graph of FIG. 15 shows average bit energy to noise ratio and a vertical axis shows a missing probability of the signal for random access in the host node.

As a value indicating a channel state, a channel gain model is defined as equation (1) below.

$$g_i = y \cdot \frac{1}{L_i} \quad \text{equation (1)}$$

In equation (1), $g_i$ denotes a channel gain between the remote node and an $i^{th}$ host node adjacent to the remote node, denotes an average path loss between the remote node and an $i^{th}$ host node adjacent to the remote node, and $\gamma$ denotes a time-varying fading component.

A channel gain for a target host node selected for random access may be determined as equation (2) below.

$$g_{max} = [g_1, g_2, \ldots, g_N] \quad \text{equation (2)}$$

In equation (2), N denotes the number of reference signals received by the remote node, and a channel gain $g_{max}$ for a selected target host node is the largest value among channel gains $g_1, g_2, \ldots, g_N$ measured from reference signals received by the remote node.

A simulation environment in FIG. 15 is as follows. The number of host nodes adjacent to the remote node is 3, a Doppler frequency is 10 Hertz (Hz), and a channel model is a Rayleigh fading channel.

FIG. 15 illustrates the signal detection performance for random access of the host node when the same transmission power is used in the case where the number of adjacent host nodes is one, two, or three according to embodiments of the present disclosure. Referring to FIG. 15, it may be noted that the signal detection performance (that is, a random access success probability) for random access of the host node is improved when there is a plurality of host nodes.

Figure 16:
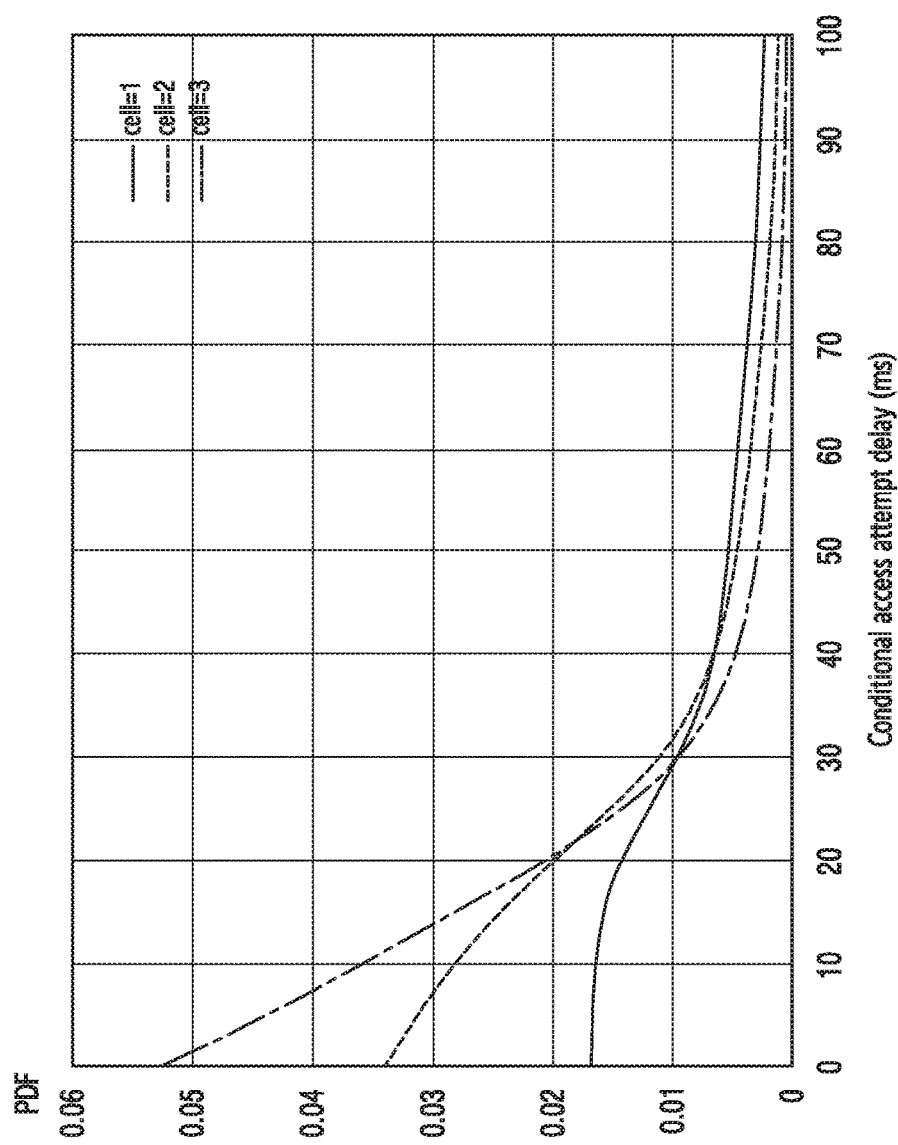
FIG. 16 illustrates another example of a graph showing the performance of transmission of a signal for random access according to embodiments of the present disclosure.

FIG. 16 illustrates another example of a graph showing the performance of transmission of a signal for random access according to embodiments of the present disclosure. A simulation environment in FIG. 16 is the same as the environment in FIG. 15.

Referring to FIG. 16, a horizontal axis indicates a time delay in random access and a vertical axis indicates a probability density function. As described above, when the random access of FIGS. 4 to 9 is performed, a time delay may occur since waiting may be performed until a channel state becomes good. The graph in FIG. 16 shows that the largest number of samples is distributed in a low time delay on average when the number of cells is 3. In other words, it may be noted that, as the number of host nodes adjacent to the remote node increases, the time delay for random access may decrease.

Figure 17:
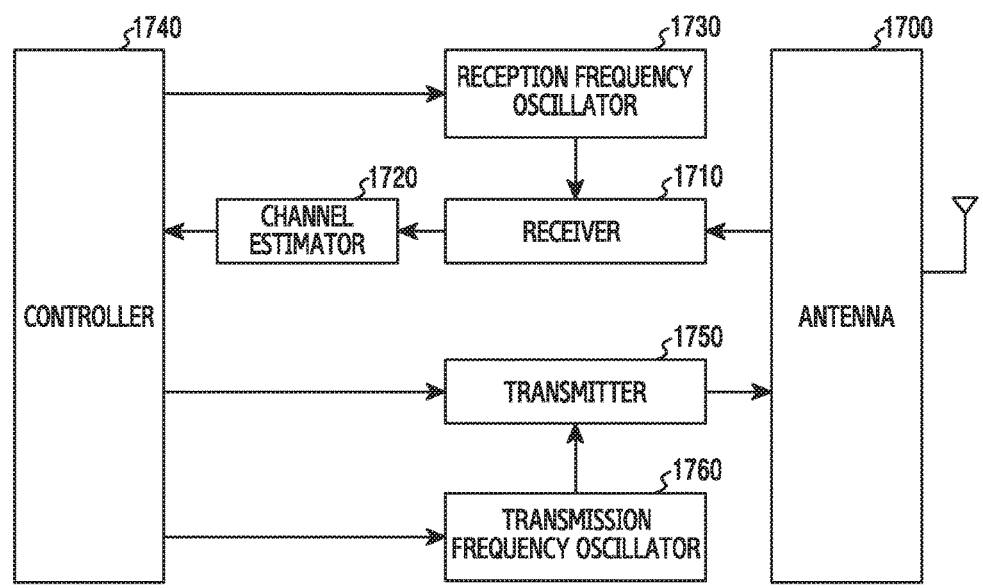
FIG. 17 illustrates an example of a hardware configuration of the remote node in the wireless communication system according to embodiments of the present disclosure.

FIG. 17 illustrates an example of a hardware configuration of the remote node in the wireless communication system according to embodiments of the present disclosure. The term "~unit" or "~er" used hereinafter may refer to a unit for processing at least one function or operation and may be implemented in hardware, software, or a combination of hardware and software.

As illustrated in FIG. 17, the remote node includes an antenna 1700, a receiver 1710, a channel estimator 1720, a reception frequency oscillator 1730, a controller 1740, a transmitter 1750, and a transmission frequency oscillator 1760.

The antenna 1700 receives a signal transmitted through a wireless channel or transmits a signal that the remote node desires to transmit through a wireless channel. Although FIG. 17 illustrates only one antenna, the remote node may include a plurality of antennas. The receiver 1710 reconstructs data from the signal provided from the antenna 1700. For example, the receiver 1710 may include a radio frequency (RF) reception block, a demodulation block, and a channel-decoding block. The RF reception block may include a filter and an RF preprocessor. The channel-decoding block may include a demodulator, a deinterleaver, and a channel decoder.

The channel estimator 1720 estimates a downlink channel by using a reception signal provided from the receiver 1710. For example, the channel estimator 1720 may measure reception power by using a reference signal received through a downlink channel.

The reception frequency oscillator 1730 generates a frequency for receiving a signal by the receiver 1710. In general, a reception frequency and a transmission frequency are differently set in an FDD mode.

The controller 1740 selects a channel to be used for transmitting a signal for random access based on an identifier of the remote node and time information, and generates a message to be transmitted to a random-access channel. Further, the controller 1740 controls the transmitter 1750 to transmit a signal through a random-access channel. The controller may be referred to as a processor or processing circuitry.

The transmitter 1750 generates a signal to be transmitted to the host node through a random-access channel under the control of the controller 1740. That is, the transmitter 1750 generates a signal to transmit a message generated by the controller 1740 to the host node through a random-access channel. That is, the transmitter 1750 converts the signal to transmit the message generated by the controller 1740 to the host node through the random-access channel into a form to be transmitted through radio resources, and provides the converted signal to the antenna 1700. For example, the transmitter 1750 may include a signal generation block, a channel encoding block, a modulation block, and an RF transmission block. The channel encoding block may include a modulator, an interleaver, and a channel encoder. The RF transmission block may include a filter and an RF preprocessor.

The transmission frequency oscillator 1760 generates a signal (e.g., a sine wave) having a transmission frequency required for transmitting a signal of the transmitter 1750 under the control of the controller 1740.

Although FIG. 17 illustrates the receiver 1710, the reception frequency oscillator 1730, the transmitter 1750, and the transmission frequency oscillator 1760 as separate modules, the receiver 1710, the reception frequency oscillator 1730, the transmitter 1750, and the transmission frequency oscillator 1760 may be configured as one module, and in this case the module may be referred to as a transceiver or a communication interface. Further, although FIG. 17 illustrates the channel estimator 1720 and the controller 1740 as separate modules, the channel estimator 1720 may be included in the controller 1740.

Meanwhile, a structure of the host node may be similar to the structure of FIG. 17. However, the operation of the controller and an actually transmitted signal are different. The controller of the host node may acquire remote node identifier information of the remote node through the channel that the remote node uses for random access. When not all information of the remote node identifier is acquired as the information on the used channel, the host node may know the remote node identifier of the remote node based on message information included in a message transmitted thereafter and the information on the used channel. Further, the host node may further include an element such as a backhaul communication interface for communicating with a core network.

Methods according to embodiments stated in claims and/or specifications of the present disclosure may be implemented in hardware, software, or a combination of hardware and software.

The software may be stored in a computer-readable storage medium. The computer-readable storage medium stores at least one program (software module) including instructions that causes, when executed by at least one processor in the electronic device, the electronic device to perform the method of the present disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs) or other type optical storage devices, or a magnetic cassette. Alternatively, any combination of some or all thereof may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access a device performing an embodiment of the present disclosure, via an external port. Further, a separate storage device on the communication network may access the device performing an embodiment of the present disclosure.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a terminal in a wireless communication system, the method comprising:
   determining candidate base stations among base stations based on each of first channel states between the base stations and the terminal that is measured during a first time interval;
   determining a base station for a random access among the candidate base stations based on each of second channel states between the candidate base stations and the terminal that is measured during a second time interval that is shorter than the first time interval; and
   transmitting, to the base station, a signal for the random access based upon identifying that a value of second channel state between the determined base station and the terminal is larger than a threshold value.

2. The method of claim 1, wherein the determining the candidate base stations among the base stations comprises measuring each of long-term channel states by using reference signals received from the base stations during the first time interval,
   wherein the determining the base station for the random access among the candidate base stations comprises;
   measuring each of instantaneous channel states by using reference signals received from the candidate base stations during the second time interval, and
   wherein the second time interval corresponds to a time interval in which the value of the second channel is within a predetermined range.

3. The method of claim 1, wherein the value of the second channel state between the base station and the terminal comprises at least one of a channel gain or a signal to interference plus noise ratio (SINR).

4. The method of claim 1,
   wherein, in a time division duplex (TDD) system, the second channel state between the base station and the terminal is obtained by estimating an uplink channel state based on a downlink channel state measurement, and
   wherein, in a frequency division duplex (FDD) system, the second channel state between the base station and the terminal is obtained by using reference signals that are transmitted from the base station through frequency resources allocated for an uplink transmission.

5. The method of claim 2, wherein the measuring the each of the instantaneous channel states comprises:
   determining the each of the instantaneous channel states based on the reference signals transmitted from the candidate base stations during a same time interval when the candidate base stations are temporally synchronized with each other; and
   determining the each of the instantaneous channel states based on the reference signals transmitted from the candidate base stations during different time intervals when the candidate base stations are not temporally synchronized with each other.

6. An apparatus of a terminal in a wireless communication system, the apparatus comprising:
   a transceiver; and
   at least one processor operably coupled to the transceiver, wherein the at least one processor is configured to:
   determine candidate base stations among base stations based on each of first channel states between the base stations and the terminal that is measured during a first time interval,
   determine a base station for a random access among the candidate base stations based on each of second channel states between the candidate base stations and the terminal that is measured during a second time interval that is shorter than the first time interval, and
   transmit, to the base station, a signal for the random access based upon identifying that a value of second channel state between the determined base station and the terminal is larger than a threshold value.

7. The apparatus of claim 6,
   wherein the at least one processor, in order to determine the candidate base stations among the base stations, is further configured to:
   measure each of long-term channel states by using reference signals received from the base stations during the first time interval,
   wherein the at least one processor, in order to determine the base station for the random access among the candidate base stations, is further configured to measure each of instantaneous channel states by using reference signals received from the candidate base stations during the second time interval, and
   wherein the second time interval corresponds to a time interval in which the value of the second channel is within a predetermined range.

8. The apparatus of claim 6, wherein the value indicating the second channel state between the base station and the terminal comprises at least one of a channel gain or a signal to interference plus noise ratio (SINR).

9. The apparatus of claim 6,
   wherein, in a time division duplex (TDD) system, the second channel state between the base station and the terminal is obtained by estimating an uplink channel state based on a downlink channel state measurement, and
   wherein, in a frequency division duplex (FDD) system, the second channel state between the base station and the terminal is obtained by using reference signals that are transmitted from the base station through frequency resources allocated for an uplink transmission.

10. The apparatus of claim 7, wherein the at least one processor, in order to measure the each of the instantaneous channel states, is further configured to:
   determine the each of the instantaneous channel states based on the reference signals transmitted from the candidate base stations during a same time interval when the candidate base stations are temporally synchronized with each other, and
   determine the each of the instantaneous channel states based on the reference signals transmitted from the candidate base stations during different time intervals when the candidate base stations are not temporally synchronized with each other.

11. An apparatus of a base station in a wireless communication system, the apparatus comprising:
   a transceiver; and
   at least one processor operably coupled to the transceiver,
   wherein the at least one processor is configured to transmit, to a terminal, reference signals for a channel estimation,
   wherein candidate base stations comprising the base station are determined by the terminal among base stations, based on each of first channel states between the base stations and the terminal that is measured during a first time interval, wherein the base station for a random access is determined by the terminal among the candidate base stations, based on each of second channel states between the candidate base stations and the terminal that is measured during a second time interval that is shorter than the first time interval, and wherein the at least one processor is further configured to receive, from the terminal, a signal for the random access based upon identifying that a value of second channel state between the base station and the terminal is larger than a threshold value.

12. The apparatus of claim 11,
wherein the each of the first channel states is obtained by the terminal, by measuring each of long-term channel states between the base stations and the terminal by using reference signals transmitted from the base stations during the first time interval, wherein the each of the second channel states is obtained by the terminal, by measuring each of instantaneous channel states between the candidate base stations and the terminal by using reference signals transmitted from the candidate base stations during the second time interval, and wherein the second time interval corresponds to a time interval in which the value of the second channel is within a predetermined range.

13. The apparatus of claim 11, wherein the value of the second channel state between the base station and the terminal comprises at least one of a channel gain or a signal to interference plus noise ratio (SINR).

14. The apparatus of claim 11, wherein the signal for requesting the random access is transmitted from the terminal in different time slots for the candidate base stations.

15. The apparatus of claim 11,
wherein, in a time division duplex (TDD) system, the second channel state between the base station and the terminal is obtained by estimating an uplink channel state based on a downlink channel state measurement, and wherein, in a frequency division duplex (FDD) system, the second channel state between the base station and the terminal is obtained by using reference signals that are transmitted from the base station through frequency resources allocated for an uplink transmission.

16. The method of claim 1, further comprising:
identifying that the value is less than the threshold value;
determining new candidate base stations among the base stations based on each of first channel states between the base stations and the terminal that is measured during a next first time interval, after identifying that the value is less than the threshold value; and
determining a new base station for the random access among the new candidate base stations based on each of second channel states between the new candidate base stations and the terminal that is measured during a next second time interval.

17. The method of claim 1, wherein the threshold value is determined based on at least one of an amount of data to be transmitted by the terminal or a required quality of the data to be transmitted.

18. The apparatus of claim 6, wherein the at least one processor is further configured to:
identify that the value is less than the threshold value,
determine new candidate base stations among the base stations based on each of first channel states between the base stations and the terminal that is measured during a next first time interval, after identifying that the value is less than the threshold value, and
determine a new base station for the random access among the new candidate base stations based on each of second channel states between the new candidate base stations and the terminal that is measured during a next second time interval.

19. The apparatus of claim 6, wherein the threshold value is determined based on at least one of an amount of data to be transmitted by the terminal or a required quality of the data to be transmitted.

20. The apparatus of claim 11, wherein the threshold value is determined based on at least one of an amount of data to be transmitted by the terminal or a required quality of the data to be transmitted.

* * * * *